(12) United States Patent
Brown

(10) Patent No.: US 10,062,045 B2
(45) Date of Patent: Aug. 28, 2018

(54) PROJECT WORKSPACE PRIORITIZATION

(71) Applicant: International Business Machines Corporation, Armonk, NY (US)

(72) Inventor: Michael S. Brown, Wahroonga (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1059 days.

(21) Appl. No.: 14/302,546

(22) Filed: Jun. 12, 2014

(65) Prior Publication Data

US 2015/0363733 A1 Dec. 17, 2015

(51) Int. Cl.
*G06Q 10/06* (2012.01)
*G06Q 10/10* (2012.01)

(52) U.S. Cl.
CPC ....... *G06Q 10/06316* (2013.01); *G06Q 10/10* (2013.01); *G06Q 10/103* (2013.01)

(58) Field of Classification Search
None
See application file for complete search history.

(56) References Cited

U.S. PATENT DOCUMENTS

| | | | | |
|---|---|---|---|---|
| 7,386,801 B1* | 6/2008 | Horvitz | ................ | G06F 3/0481 715/764 |
| 2004/0059785 A1* | 3/2004 | Blume | ................ | G06Q 10/109 709/206 |
| 2004/0261013 A1* | 12/2004 | Wynn | ................ | G06Q 10/10 715/229 |
| 2005/0097506 A1* | 5/2005 | Heumesser | ............. | G07C 1/10 717/102 |
| 2009/0006982 A1* | 1/2009 | Curtis | .................. | G06Q 10/10 715/753 |
| 2009/0254406 A1* | 10/2009 | Sichart | ............ | G06Q 10/06313 705/7.23 |
| 2010/0125814 A1 | 5/2010 | Lemons | | |
| 2012/0131495 A1* | 5/2012 | Goossens | ............. | G06F 3/0482 715/782 |

(Continued)

OTHER PUBLICATIONS

Droptask, https://www.droptask.com/.

(Continued)

*Primary Examiner* — Deirdre D Hatcher
(74) *Attorney, Agent, or Firm* — Michael O'Keefe; Matthew M. Hulihan; Heslin Rothenberg Farley & Mesiti PC

(57) ABSTRACT

Prioritization of project workspaces is provided herein. Data items are grouped into project workspaces based on workspace identifiers with which the data items have been tagged. Grouped data items included in a project workspace are tagged with a common workspace identifier that indicates association with a project corresponding to the project workspace, the project including tasks for a user. Priority of the project workspace is determined relative to priority of other project workspaces and based on ascertaining priorities of the tasks of the project by analyzing the grouped data items included in the project workspace. An indication of the priority of the project workspace relative to priority of the other project workspaces is provided for graphical presentation to the user, in order to facilitate focusing the user to a highest priority project workspace of the project workspaces.

20 Claims, 17 Drawing Sheets

(56) References Cited

U.S. PATENT DOCUMENTS

2012/0151377 A1    6/2012    Schultz et al.
2013/0145299 A1    6/2013    Steimle et al.
2015/0193100 A1*    7/2015    Strode .................. G06F 3/0484
                                                                                             715/765

OTHER PUBLICATIONS

Task Radar—Task List, https://play.google.com/store/apps/details?id=com.sockmonkeysolutions.android.tas&hl=en.
"Overview", SaND Social Technologies, http://www.research.ibm.com/haifa/projects/imt/social/sand.shtml.
"Visualizations", IBM Many Eyes, http://www-958.ibm.com/software/analytics/manyeyes/visualizations/2012-cosmetic-procedures.
Innovation Management—Collaboration Tools & More—Mindjet USA, http://www.mindjet.com/.
Stackla, http://stackla.com/.
RebelMouse, https://www.rebelmouse.com/.
Flavors.me: Create and share your digital world, http://flavors.me/.
Alternion—Your Social Hub, http://www.alternion.com/.
Peter Mell et al., "The NIST Definition of Cloud Computing", National Institute of Standards and Technology, Information Technology Laboratory, Version 15, Oct. 7, 2009 (available at: http://csrc.nist.gov/groups/SNS/cloudcomputing/index.html).
Social Business, IBM SmartCloud Docs, http://www.ibm.com/cloud-computing/social/us/en/ibmdocs/ (available at: http://www.ibm.com/cloud-computing/social/us/en/ibmdocs/).
IBM Notes, IBM Notes and Domino 9 Social Edition (available at: http://www-03.ibm.com/software/products/en/ibmnotes).

* cited by examiner

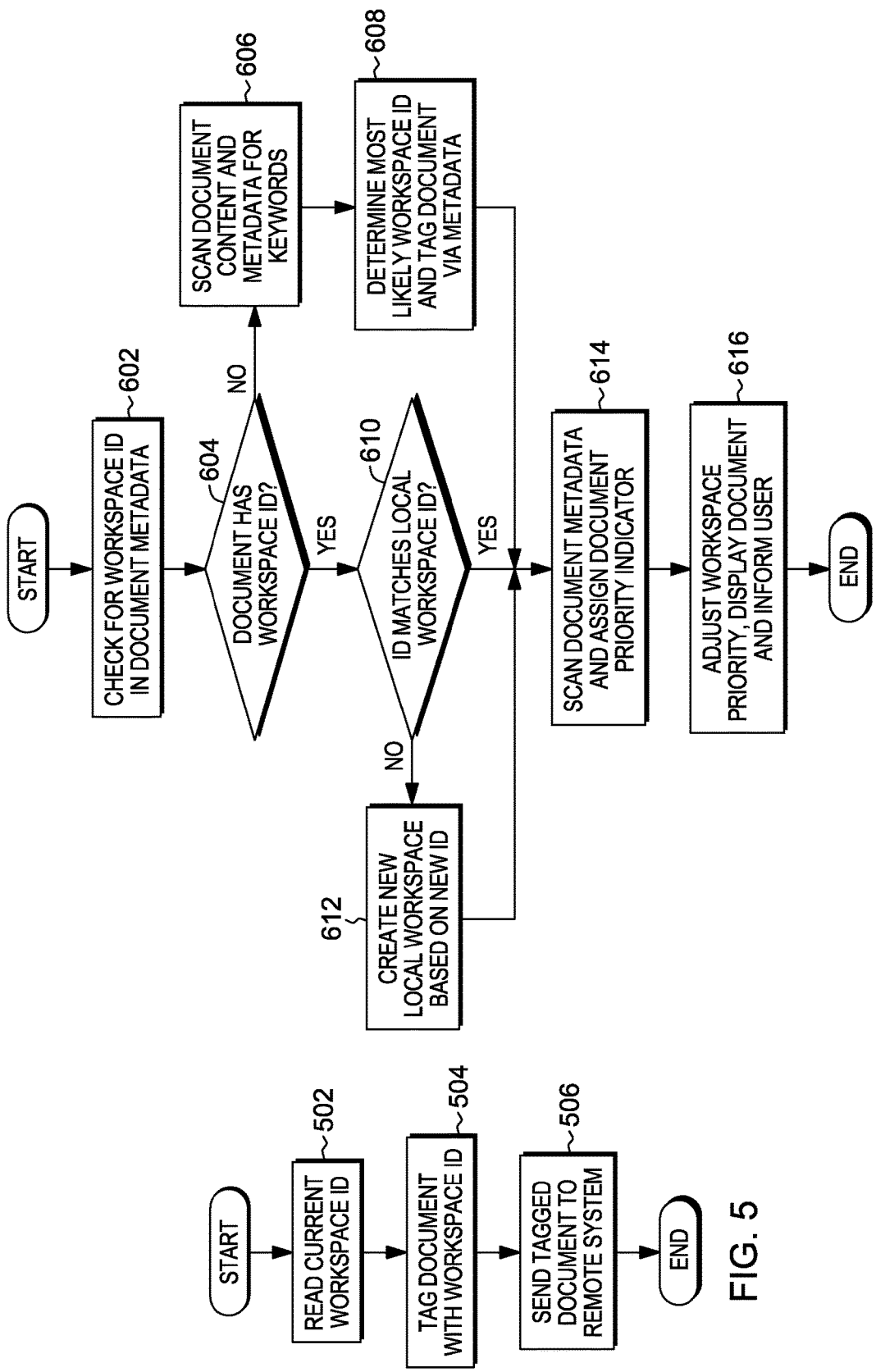

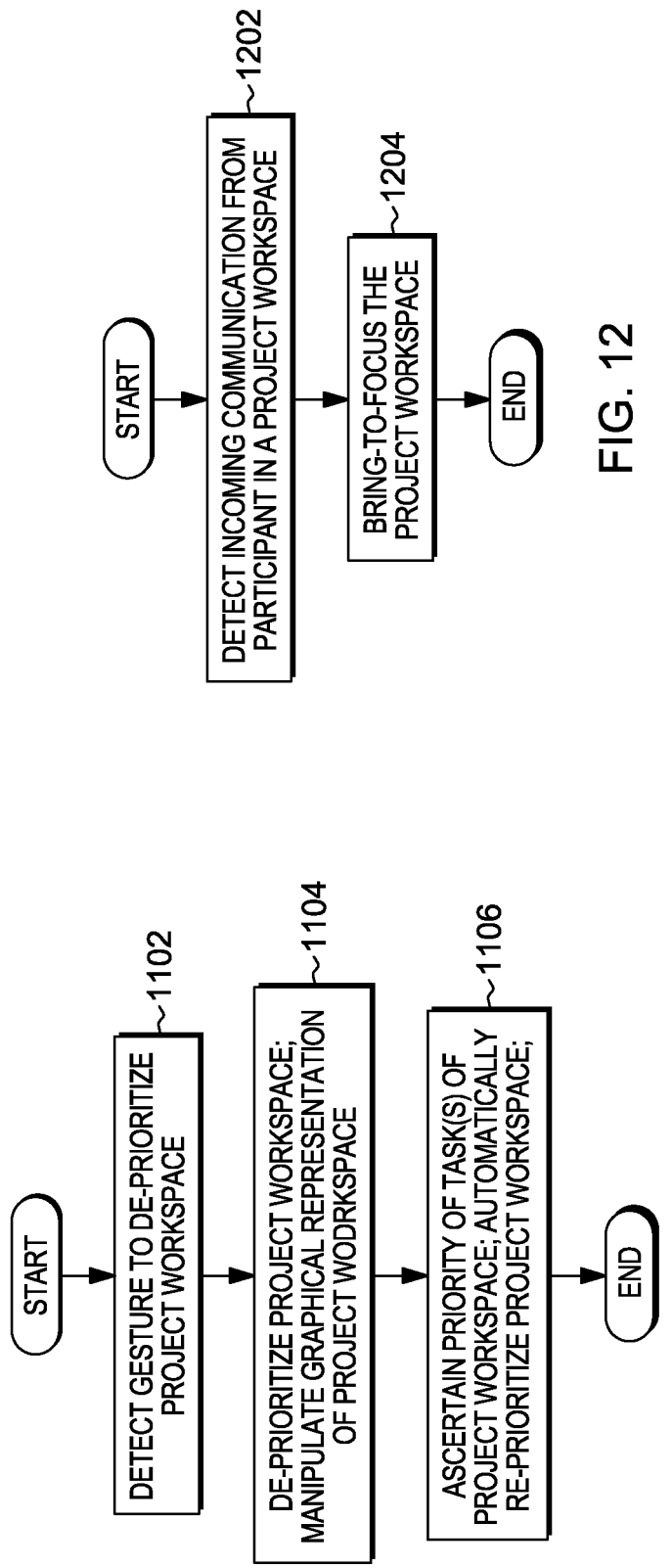

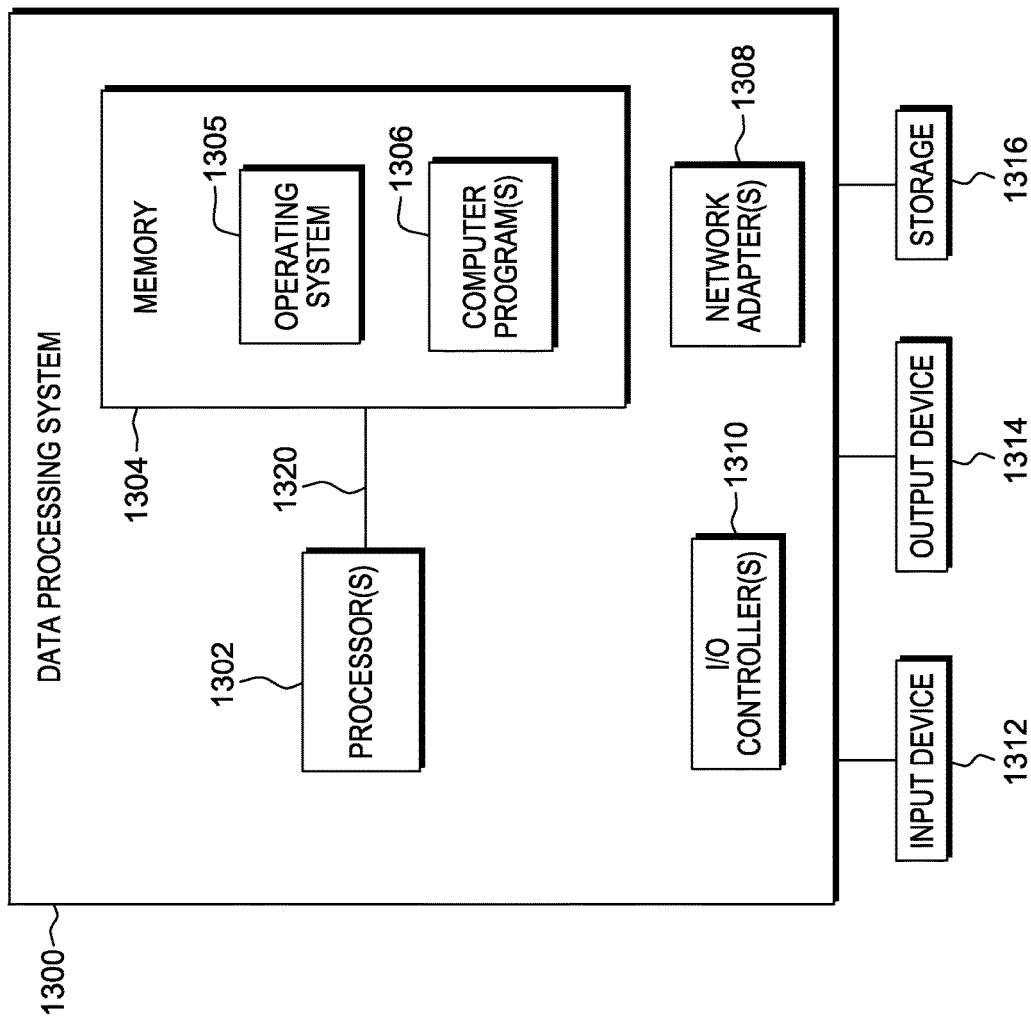

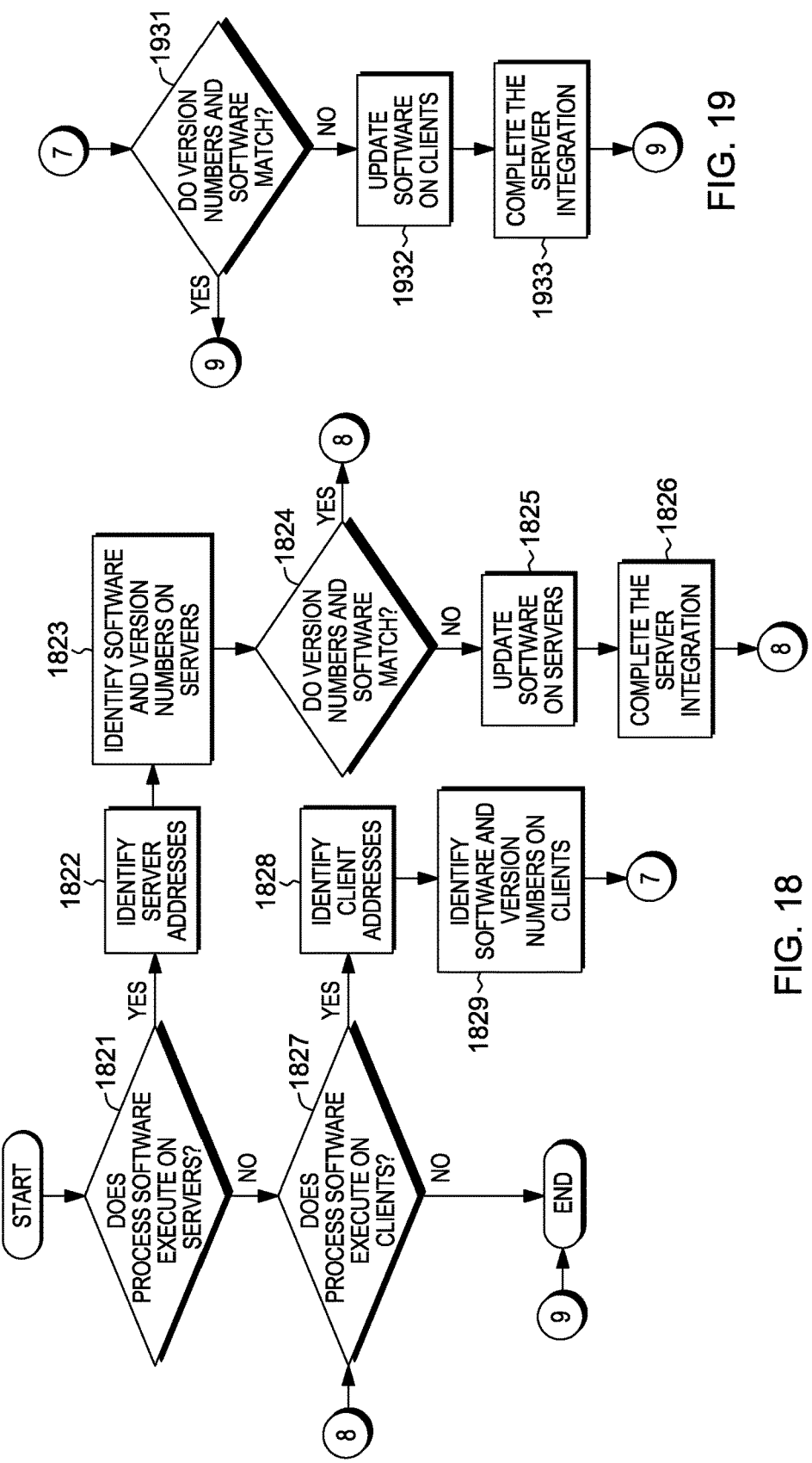

PROJECT WORKSPACE PRIORITIZATION

BACKGROUND

As business speed increases, people find themselves working on multiple projects and tasks at once. A result of this multitasking is that personal and team productivity can be negatively impacted as people change between related or unrelated tasks and try to prioritize their work-day.

Traditional task or "to-do" lists are limited in functionality. It may not be possible to relate listed tasks, for instance, to each other in any way beyond the use of nested folders. Apart from a user manually changing basic weighting attributes, there is no way to re-prioritize tasks.

Furthermore, communication systems, such as email communication systems, that may be involved in projects typically default to having information sorted with the most recent message at the top, by sender, or similar. A chronologically sorted inbox, for instance, is unlikely to align with a user's current-day desired workload prioritization. That can cause the user to become sidetracked and focus on items that may not be urgent in terms of priority, simply because those items are most visible based on the inbox's display of most recently receive messages.

With the prevalence of touch and gesture-enabled computer interfaces, a more natural way is desired for interacting with software; one that aligns the user interface to work the way humans do, rather than the reverse.

BRIEF SUMMARY

Shortcomings of the prior art are overcome and additional advantages are provided through the provision of a method that includes grouping data items into a plurality of project workspaces based on workspace identifiers with which the data items have been tagged, wherein grouped data items included in a project workspace of the plurality of project workspaces are tagged with a common workspace identifier, the common workspace identifier indicating association of the grouped data items with a project to which the project workspace corresponds, wherein the project includes one or more tasks for a user; determining, by a processor, priority of the project workspace relative to priority of one or more other project workspaces of the plurality of project workspaces, wherein the priority of the project workspace is determined based on ascertaining priorities of the one or more tasks of the project by analyzing the grouped data items included in the project workspace; and providing an indication of the priority of the project workspace relative to priority of the one or more other project workspaces for graphical presentation to the user, to facilitate focusing the user to a highest priority project workspace of the plurality of project workspaces.

Further, a computer system is provided that includes a memory and a processor in communication with the memory, wherein the system is configured to perform a method including: grouping data items into a plurality of project workspaces based on workspace identifiers with which the data items have been tagged, wherein grouped data items included in a project workspace of the plurality of project workspaces are tagged with a common workspace identifier, the common workspace identifier indicating association of the grouped data items with a project to which the project workspace corresponds, wherein the project includes one or more tasks for a user; determining priority of the project workspace relative to priority of one or more other project workspaces of the plurality of project workspaces, wherein the priority of the project workspace is determined based on ascertaining priorities of the one or more tasks of the project by analyzing the grouped data items included in the project workspace; and providing an indication of the priority of the project workspace relative to priority of the one or more other project workspaces for graphical presentation to the user, to facilitate focusing the user to a highest priority project workspace of the plurality of project workspaces.

Yet further, a computer program product is provided that includes a computer readable storage medium having program instructions embodied therewith, the program instructions executable by a processor to cause the processor to perform a method including: grouping data items into a plurality of project workspaces based on workspace identifiers with which the data items have been tagged, wherein grouped data items included in a project workspace of the plurality of project workspaces are tagged with a common workspace identifier, the common workspace identifier indicating association of the grouped data items with a project to which the project workspace corresponds, wherein the project includes one or more tasks for a user; determining priority of the project workspace relative to priority of one or more other project workspaces of the plurality of project workspaces, wherein the priority of the project workspace is determined based on ascertaining priorities of the one or more tasks of the project by analyzing the grouped data items included in the project workspace; and providing an indication of the priority of the project workspace relative to priority of the one or more other project workspaces for graphical presentation to the user, to facilitate focusing the user to a highest priority project workspace of the plurality of project workspaces.

Additional features and advantages are realized through the concepts of aspects of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts an example process for tagging a locally created data item, in accordance with aspects described herein;

FIG. 6 depicts one example of data item tagging and priority adjustment based thereon, in accordance with aspects described herein;

FIG. 11 depicts one example of a process to temporarily de-prioritize a project workspace, in accordance with aspects described herein;

FIG. 12 depicts an example process of focusing a project workspace based on an incoming communication, in accordance with aspects described herein;

FIG. 13 depicts one example of a data processing system to incorporate and use one or more aspects described herein;

FIGS. 18 & 19 collectively depict an example process for integration service delivery, in accordance with aspects described herein;

DETAILED DESCRIPTION

Figure 1:
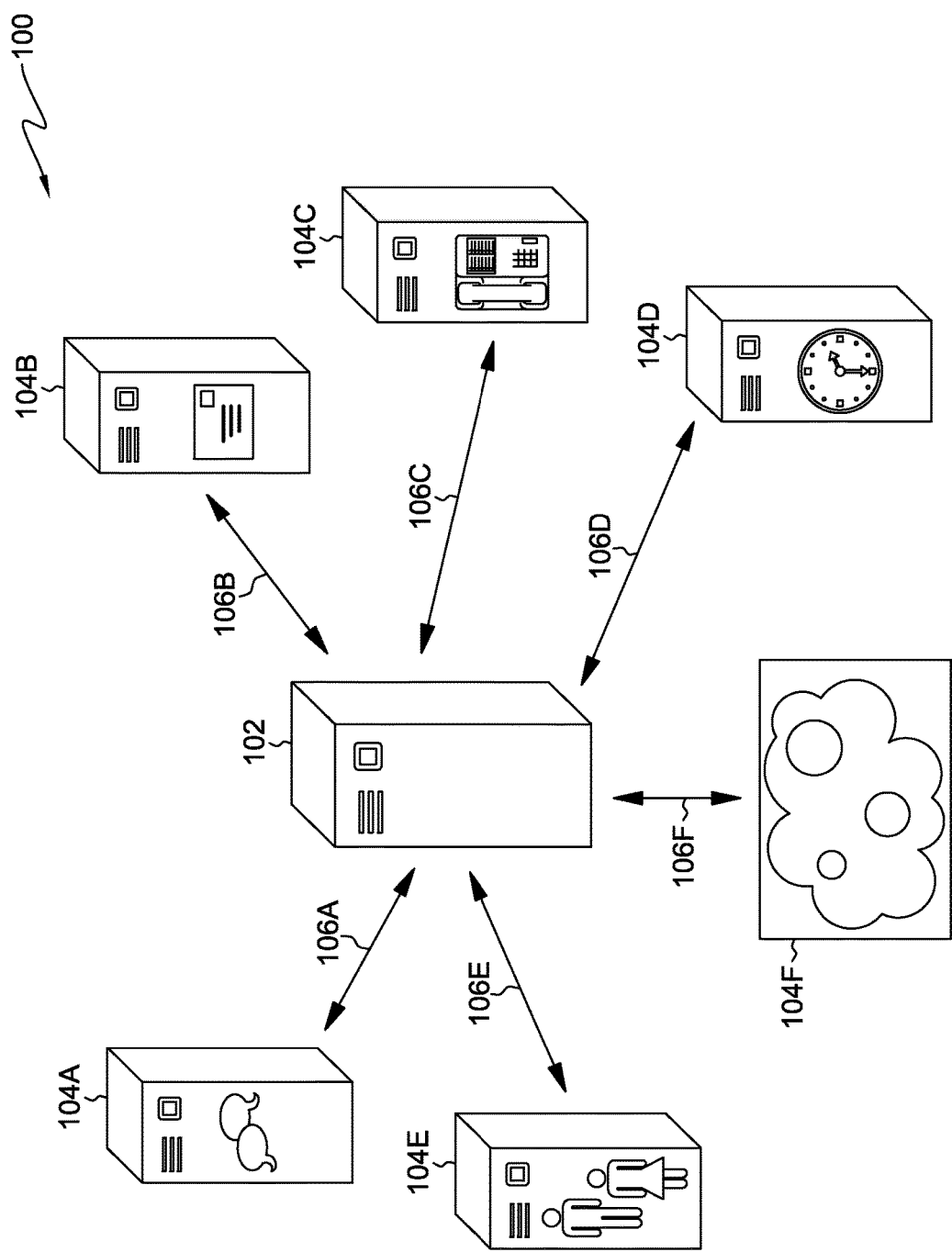
FIG. 1 depicts one example of a computing environment to incorporate aspects described herein.

Aspects described herein provide enhancements over conventional to-do lists, integrating tasks with existing IT services, and providing new user interfaces that are task-centric and auto-prioritize users' workloads. Systems and methods described herein provide ease of use, offering improvements over typical desktop environment designs having multiple stacked windows of different opened programs in which the user is forced to remember what he/she was doing and then open the relevant windows to work with the multiple applications. Instead, provided herein, multiple project workspaces are used to track and prioritize what tasks the user is working on, and should work on, based partially on received feeds from external systems such as calendars, telephone, email, and instant messaging systems, as examples.

In some embodiments, a user's current workload is represented by a free-form "cloud" visually representing (e.g. as bubbles). Project workspaces having tasks are represented visually. The priorities of these workspaces are represented to the user, may be relative to each other, may indicate what the user is to work on, and may be adjusted dynamically and automatically in real time and alert the users to that adjustment. Additionally, the user may manually adjust the priorities of what they are working on. The bubbles (or other graphical representations of the project workspaces) may increase in size and slowly drift toward the middle (or other focal point) of the cloud, depending on importance and urgency. Importance and urgency may be determined automatically from feeds from other data sources, such as email systems, calendar events, project milestones, social networking data, and so forth.

User interfaces are provided for graphically depicting project workspaces and focusing users' attentions to different projects and/or tasks within those projects. (It should be understood that the terms 'project workspace' or just 'workspace' may be used herein for convenience to refer to the graphical depiction of such project workspace in a user interface). The user may have a set of project workspaces that are centric around the task(s) or project(s) that the user is working on. The projects/tasks may contain subtasks. Data items, such as documents that are created, emails, spreadsheets, database items, etc. are represented inside the project workspaces to which they correspond, and can be grouped based on tags. This is contrasted to environments in which data items are opened in or associated with only the respective application through which they are received or created. The user interfaces may provide various functionalities described herein. As one example, if there is a project workspace or a task of a project to which the workspace corresponds that a user desires to temporarily put aside, the user could do that through the user interface.

People are most productive when they are concentrating on one task at a time and distractions are minimized. Having correspondence and other types of data items relevant to a project automatically sorted into a correct workspace helps to minimize distractions. If a user wants to concentrate on a specific task or project, he/she can push the other task/project bubbles off to the side of the screen, for example. These de-prioritized projects can remain there for a predetermined time or until a workspace requires attention, at which point it can be brought to the attention of the user by drifting the workspace back toward the center, or other focal point, of the screen to obtain the user's attention. A project may require attention based on factors that might indicate how urgent the project or task(s) thereof are, such as through incoming emails or phone calls. In this regard, a trigger for raising priority of a project (or re-prioritizing a temporarily de-prioritized project) could be a due date for a task or a specified number of unread emails related to the task in the user's inbox, as examples.

There are various ways of triggering reminders, focusing to a project workspace or task thereof, etc. For example, if an email is received from a participant in a particular project (for instance the user's boss) saying something project-related is urgent, that email may become associated with the appropriate project workspace, and the user's attention may be directed to that workspace. The workspace may be brought to the front of the user interface or it may increase in size proportionally to how important rules set up in the interface dictate the project should be in light of the email. Additionally, time sensitive events, such as the start of a meeting, can cause the associated project workspace to automatically take focus and open, enabling the user to prepare and attend the meeting. When focus is taken away from a workspace, work in that workspace may be automatically saved and the user can pick-up where he/she left off when the focus returns to that item.

Other aspects can alter the position of the project workspace or the way the user interacts with a project workspace. Examples include a user defining a deadline that is approaching for a particular task or whole project, or the user having regular items that need to be completed on a periodic basis (like submitting a timesheet on the 12th of each month, or submitting an expense report toward the end of each month, as examples). In these cases, the project workspace having the recurring task may become more prominent in the user interface around that time that the task should be addressed.

By way of specific example, assume a user is working on four major projects contemporaneously, each having its respective associated tasks. The system can create four project workspaces each represented as a large bubble in the user interface window. Within each of the bubbles would be the task(s) of the associated project, such as 'Correct presentation for my boss' or 'Claim my expenses for travel related to this project', as examples.

Expanding one of these project bubbles gives a workspace in which the user can concentrate on working on the related set of tasks and their corresponding data items. Items such as related emails, documents, and social network contacts may be easily viewed and edited from within the workspace. Outgoing feeds (such as updates to a timesheet system as explained below) can be automatically provided based on, e.g., hours worked on particular projects, calculated by how long each workspace/bubble has had primary focus.

A workspace contains data items/objects such as files, documents, spreadsheets, emails, chats, calendar events, social networking update, contacts, etc. and can be changed in size and position (automatically and/or manually by a user) to indicate its priority/importance. Tasks can be moved around by a user and become more dominant based on criteria such as due date, amount of email traffic, updates to the documents, creation of new data items within a workspace, and others. Priority changes can be represented visually to a user using any variety of methods, such as by increasing the size of the bubble/container and/or moving it to the center of the user's display). Data items can be created within a workspace and automatically tagged with a project workspace identifier, for instance, unique to the project workspace, and then data item events can be used to alter the priority of that workspace.

A workspace represents one or more tasks that are related to a common project. The size of the workspace can be changed dynamically to indicate importance/priority of the project, which may be based on the importance of the task(s) of the project.

The workspaces may be free form and moved around by the user. Workspaces become more dominant based on criteria such as due dates, for tasks, as an example.

Priority changes to the workspaces can be represented in any of various ways. Example embodiments increase size of the container (bubble) and/or move the container closer to a focal point of the user's display, though other indicators could be provided, such as by highlighting, flashing, animating, etc the container.

Systems according to aspects described herein may be based around a server that provides for grouping of tasks and related data items into project workspaces. When working on a project or task, rather than switching between individual programs for email, calendar, chat, word-processing, spreadsheets, and other data items, a project workspace described herein groups related work items together. This is described and depicted with reference to FIGS. 1 and 2.

FIG. 1 depicts one example of a computing environment to incorporate aspects described herein. Computing environment 100 includes a central server data processing system 102. Server 102 is in communication with remote devices including a chat system 104A, email system 104B, telephony system 104C, timekeeping system 104D and social network system 104E, across wired or wireless communication paths 106A-106E respectively. A communication path may include one or more digital or analog connections operating via wired or wireless technology to facilitate communication with another system. As an example, a communication path may be any type of network connection such as a local area network (LAN), a wide area network (WAN), a token ring, an Ethernet connection, etc. Server 102 is also in communication with client device 104F across communication path 106F. In some examples, each of systems 104A-104F are a data processing system. Example data processing systems include desktops, laptops, smartphones, tablets, slates, or other computing devices.

FIG. 1 depicts an environment in which separate systems are provided for handling different activities. Chat system 104A is a server that provides for chat messaging, social networking system 104E provides social networking facilities, email system 104B supports email and possibly calendaring, timesheet system 104D supports maintaining records of time worked on different matters, and so on. The server 102 receives feeds from those different external systems and passes information to client device 104F. For instance, emails and chat messages will arrive and be passed to the client device.

In conventional environments, information from the various external systems might be directed into the relevant individual application on the client device. In accordance with aspects described herein, that information (referred to herein as data items) is instead, or additionally, received into a relevant project workspace to which the data item is related. As described below, incoming data items are tagged to indicate to which project workspace(s) the data item is to be associated.

In the example of FIG. 1, the feeds from the external systems are received by central server 102 to which the user's client device 104F is connected. The central server then provides for data item grouping and project workspace functionality described herein. In some embodiments, client software on client device 104F receives communications from the server and constructs the user interface for presentation to the user. In other embodiments, this is performed on the central server and client device 104F is a thin client that presents a user interface communicated to it by central server 102.

In still further embodiments, the central server 102 is omitted, the feeds are received directly by client device, and the relevant grouping and prioritizing described herein is performed by the client device.

Figure 2:
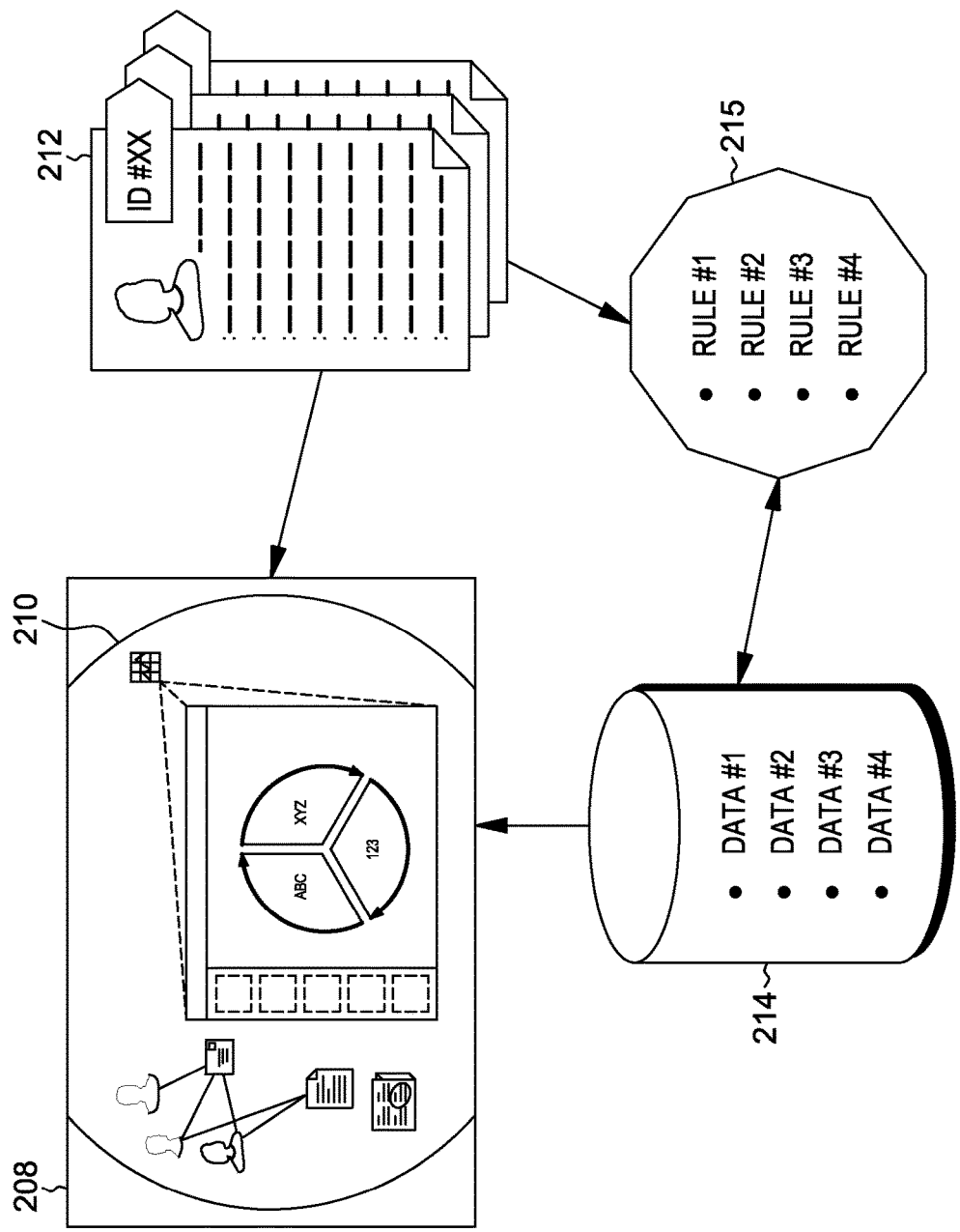
FIG. 2 provides a conceptual depiction of data item tagging and workspace compositioning, in accordance with aspects described herein.

FIG. 2 provides a conceptual depiction of data item tagging and workspace compositioning in accordance with aspects described herein. User interface 208 is provided on a client system and includes a task-centric workspace 210 providing logical groupings of documents and other data items that are associated with project workspace 210. The workspace provides the user the ability to create, view, store, retrieve, and manipulate documents and other data items specific to the current workspace and task(s) thereof that he or she is working on. This is done via compatible applications that run on the local system, in some embodiments, or on a remote system in other embodiments, and integrate with the user interface component providing the workspace. The user is able to work inside of this single environment, where applications that handle the data items, such as an email application or spreadsheet application would effectively work as a plug-in to the user interface and would appear within a workspace environment on the graphic user interface for the user. This approach enables the user to work with differing types of data items, which conventionally required the user to interact with different applications, except without having to tab between all of the programs. It also enables the user to do so without the user having to switch to the relevant program and then identify/find the particular data item(s) of relevance to the given project that the user is currently working on. That is, only the relevant emails, spreadsheets, etc. would be presented to the user within the workspace, so that the user would not need to flip through all open spreadsheets, or search the user's email inbox to open the relevant emails. Instead, these items would be presented within the workspace of that project. Instant message chat history for that project, a contact card or other information from a social network or directory of the people working on the same team involved with the project, and any other data items that are associated with the project can be presented as part of the active project workspace. Only documents and other data items relevant to the currently visible workspace are shown, and the workspace visually represents the priority of each workspace and tasks thereof to the user so that he or she can focus on the tasks that will most efficiently maximize productivity.

Data items 212 can be any data object. Examples include variations of current document/data formats such as word-processing, spreadsheets, graphics, presentations, HTML, or audio-visual media; communications documents such as chat sessions, call logs, or social media feeds; data structures representative of contact, profile, address, or directory information; or any other type of data item. Each item is tagged with a workspace identifier (ID) tag. A data item may be tagged when the data item enters the system (e.g. from an external feed) or is created within a workspace. In this manner, data items may be automatically tagged as being part of a particular project workspace to appear therein, in order to facilitate streamlined collaboration and usability of the data items relevant to the project. Data items entering the system not within the context of a particular workspace (for instance an email coming in cold that is not part of a previous chain of emails) may be scanned, parsed, or otherwise data mined automatically by the system and identified to be associated with a particular existing workspace or a new workspace. As examples, the server or an application on the client device could scan text of a data item for keywords and figure out with a degree of certainty which workspace the data item is to be assigned-to. The user could then verify the assignment or re-assign if desired.

Many data items do not enter the system cold, however. They are instead a reply of follow-up to, or discernibly related to, a data item previously associated with the workspace. A reply email or updated version of a document are examples of this. A reply to a previously sent email already associated with a workspace would be readily identifiable as being such, and would be tagged with the workspace identifier of that workspace when it is received by the system. Once a user (or the system) establishes a workspace, any emails sent from that workspace (via a plug-in to the email system, for instance), may be automatically tagged with that workspace ID so that any replies to the email will automatically be tagged with that same workspace ID.

A personalized (for the user) database 214, stored at the server, client, or combination thereof, contains the definition of tasks defined for the workspaces and their priority profiles, the relationship between data items and the one or more workspaces, and statistical analyses of workspace data items to assist with the matching of untagged data items to existing workspaces.

Rules engine 215 contains programming logic to read workplace ID tags of incoming data items and to determine/generate appropriate tags for untagged data items. It can also adjust the priority index and rule set for each workspace based on events such as incoming data items or user input, and can write this data back to the database component 214. Rules engine 215 may be maintained anywhere, though it may be preferred to maintain rules engine 215 on the component(s) hosting database 214 because it will accesses information of the database.

Figure 3:
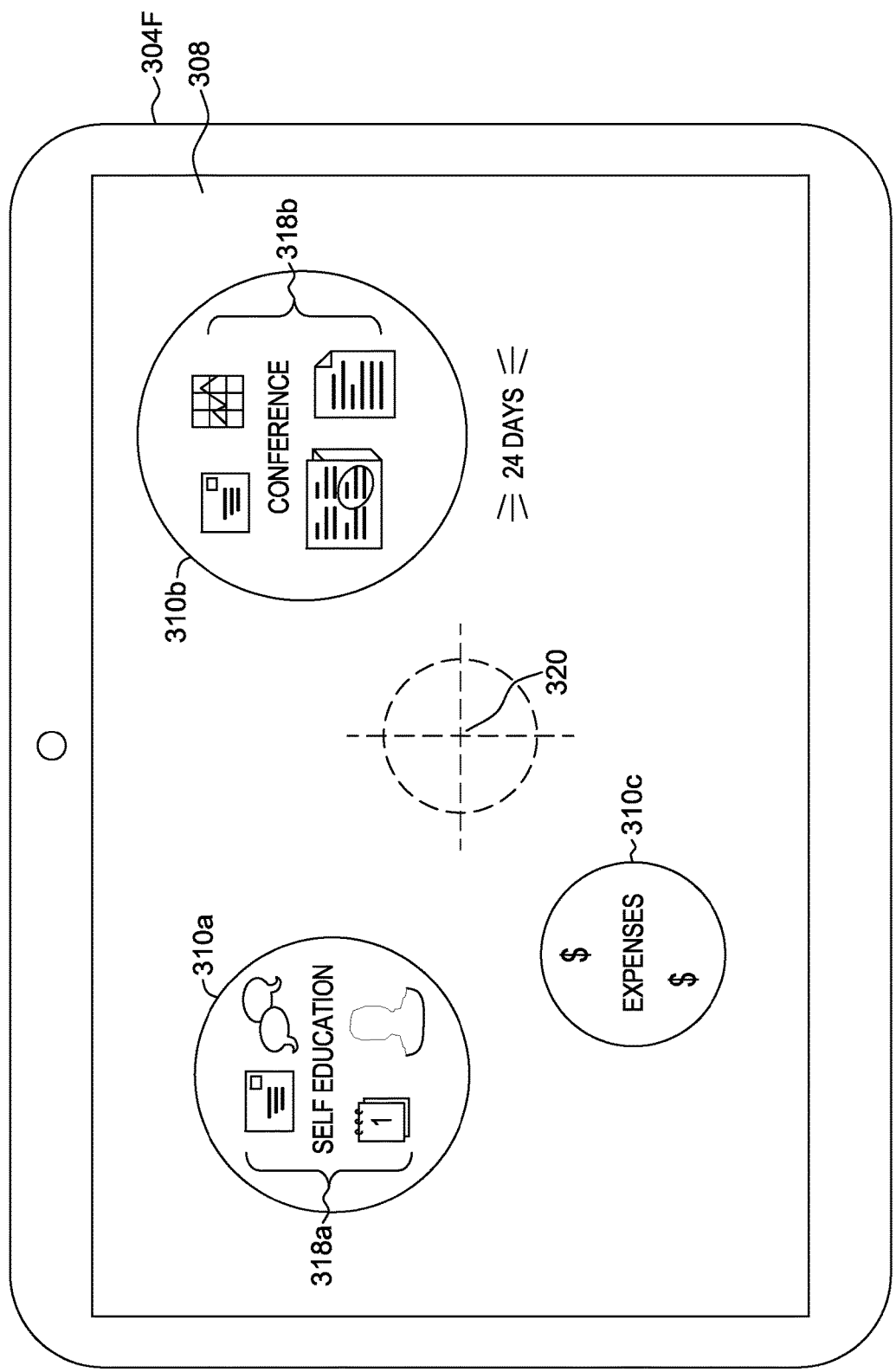
FIG. 3 provides an example user interface graphically depicting prioritized project workspaces, in accordance with aspects described herein.

FIG. 3 provides an example user interface graphically depicting prioritized project workspaces in accordance with aspects described herein. In the example of FIG. 3, client device 304F is a mobile device, and more specifically a tablet data processing system running an operating system such as an iOS-based operating system offered by Apple Inc, Cupertino, Calif., USA (i.e. iPhone® and iPad®), Android-based operating system offered by the Open Handset Alliance, or other kind of mobile operating system. Additional mobile device types are also contemplated. Client 304F displays user interface 308, and the user interface presents to the user three (in this example) project workspaces 310a, 310b, and 310c. Workspaces may be labeled (Self Education, Conference, Expenses in this example) and present a preview of the data items or types of data items included within the particular workspace (see 318a and 318b in this example).

Additionally, the graphical presentation of the workspaces 310a, 310b, and 310c to the user provides indication of priority of each of the workspaces, as well as the priority relative to each other. For instance, a priority for workspace 310b is "24 days". That priority may represent any priority associated with the project, for instance the completion date of a next task due for the project, completion date of all tasks of the project, or any other priority. Note that a task refers generally to any item, action, or occurrence related to a project. It includes creation, review, modification, production, and/or delivery of data items, but also includes attendance at meetings or calls, completion of steps in a process, such as booking a flight, or any other action item involved with the project. Tasks for a first user involved with a project may be different from the tasks for a second user involved in the project, and therefore the priority depiction of the project workspace on the first user's client interface may be different from the priority depiction of that project workspace on the second user's client interface.

The higher the priority of a project workspace, the larger the workspace may be represented in the interface. Additionally or alternatively, the depicted size of the workspace may be a function of the number of tasks and/or data items that are included within that project workspace. Priority may also, or alternatively, be depicted through proximity to a focal point (320). Higher priority workspaces may be depicted closer to the focal point, for instance.

In the case of FIG. 3, the user has a project to organize a conference (workspace 310b), which starts in 24 days time. The user has also agreed to allocate a percentage of the user's time to Self Education (workspace 310a). These two projects are represented by the two larger circles. Additionally, because it is almost the end of the month, a repeating task bubble (workspace 310c) reminding the user to claim expenses is presented and, over time, drifts toward the focal point 320 of the screen. The repeating task is repeating in the sense that the user is to submit expenses periodically (e.g. every month). A repeating workspace 310c may be setup with that task such that some number of days (five) before the end of the month, the workspace is presented on the user interface to make the user aware of it. If the user wishes, he/she can de-prioritize the task of submitting an expense report by swiping the workspace off of the screen one or more times (perhaps every day) until a certain point (say the fifth day) at which the user may no longer be able to de-prioritize the workspace.

When the user zooms in on a workspace (for instance by selecting its graphical representation), information specific to that workspace and set of tasks included therein can be displayed. Opening up the Self Education workspace 310*a* may show data items associated therewith, for instance previous chat with the user's mentor, some emails about course material, a link to the user's manager, and a self-education video. While in the Self Education workspace, if the user receives a telephone call from someone who is helping organize the conference, the data item that the user is working on in the Self Education workspace 310*a* automatically pauses, and the Conference workspace 310*b* is automatically expanded to take focus on the screen when the call is answered. When the call terminates, the Conference workspace may be minimized and the Self Education workspace may expand presenting the data item that was paused when the call was received.

Expanding the Conference workspace may allow the user to work on tasks associated with the project of planning the conference. Example tasks include preparation of a presentation for the conference, as well as other documents like the costs spreadsheet and agenda document. Any new emails that have been tagged with this project workspace ID will also appear in this workspace. While this workspace is expanded, the system can track and maintain a log of hours and pre-populate the user's timesheet at the end of the week. Additionally, the user can work on documents directly from within the workspace.

Figure 4:
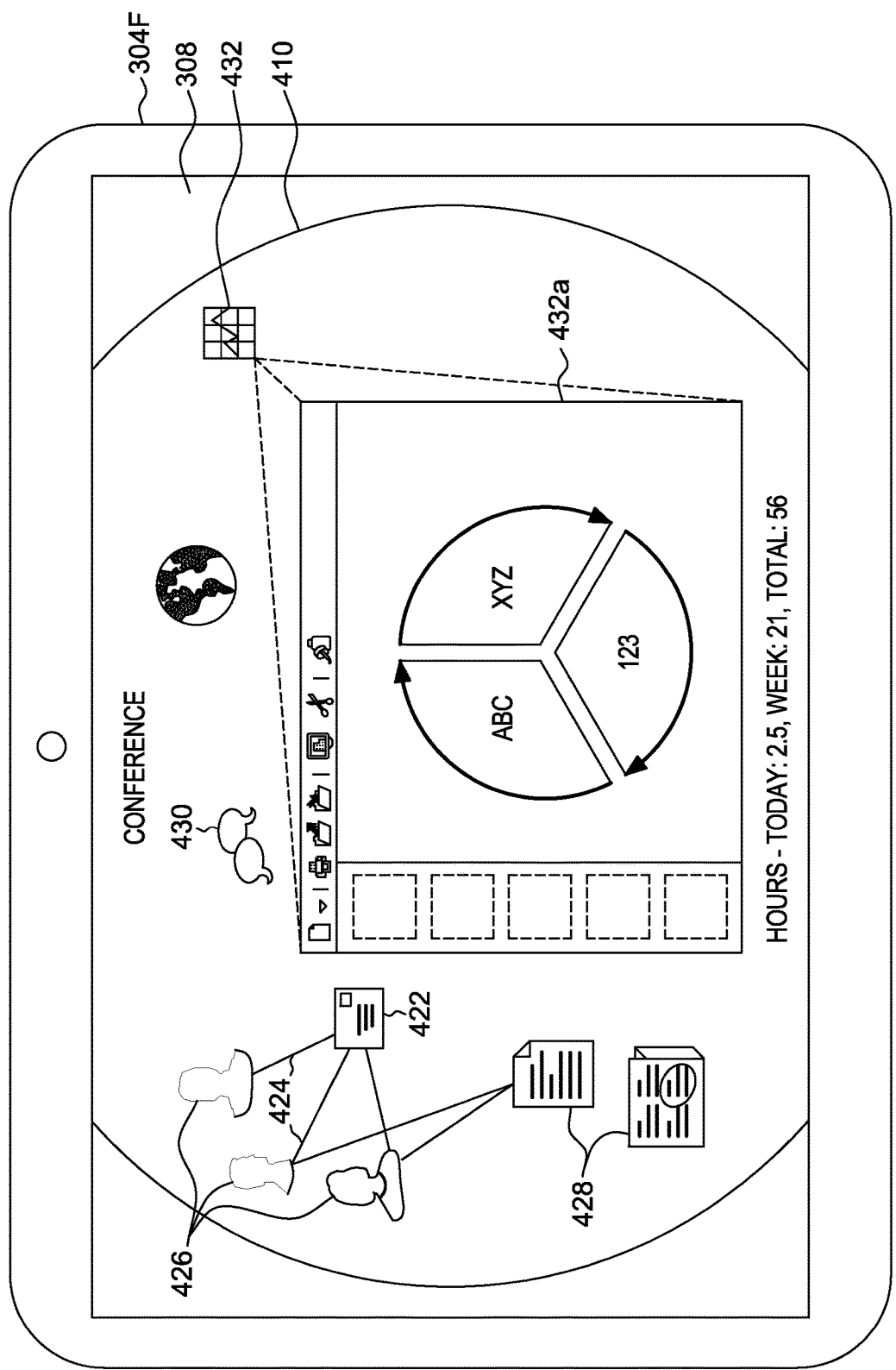
FIG. 4 depicts an example project workspace in a user interface, in accordance with aspects described herein

Further details of the above are depicted and described with reference to FIG. 4, which depicts an example project workspace in a user interface, in accordance with aspects described herein. FIG. 4 depicts client device 304F having user interface 308 presenting workspace 410 (which in this example is workspace 310*b* from FIG. 3). The time worked on that project may be tracked based, for instance, on the workspace being selected and the user actively working with data items of that workspace. The time spent for the present day, week, and total time worked on the project are displayed in workspace 410 in FIG. 4. Additionally or alternatively, the due date of different subtasks may be depicted.

Within the workspace, objects can be rotated and focused in a three-dimensional representation, akin to a mind map. For example, clicking on an email (422) can show links (424) to people/contacts (426) that are on that email thread. The converse is true too; clicking on a person can show links to email threads that are related to the project and that that person has participated in. Objects such as emails (422), documents (428), chats (430), and other data items can be opened and worked-on directly in the user interface, and more specifically within the project bubble. Thus, when in a workspace, relevant documents are made easily available to avoid having to search through folders on a hard drive and open a separate application to view the file. In FIG. 4, a data item, e.g. presentation 432, is selected in the workspace by the user and, based on that selection, the item is brought-up within the workspace as object 432*a* for viewing/editing. In some examples, an engine of the native application for handling that format of data item is used to support the creating, opening, viewing, editing, saving, etc. functionality of data items of that type directly in the workspace.

Enabling end users to create data items (such as spreadsheets, emails, chats, to-do items, status updates, etc.) directly from their workspace allows data items to be automatically tagged with a unique identifier when they are created or added to the workspace. In one embodiment, once the user has created a project workspace, data items created within that workspace are automatically tagged with the workspace ID for the project, and incoming data items related to those items (correspondence, incoming files, etc.) are automatically tagged with the same workspace ID and integrated into that workspace. Thus, when data items such as emails, documents, messages, and social networking posts are replied-to or updated, the incoming replies/updates may be tagged to group those items with the others of the common workspace. Further, these and the other data items of the workspace can be analyzed to determine relative priorities between multiple workspaces and tasks thereof. Minimal or no manual tagging may be employed.

In addition to tracking time spent working within a workspace, the system can use this awareness of the current workspace a user is working in to automatically display to others what project the user is working on, and/or display for that user what other users involved in that project are currently available. This can be provided as part of the user's "status" in a chat, social networking, messaging, or similar environment (which may or may not be presented within the user interface of the client device for a user). Example statuses include Do Not Disturb, Away, Active, Logged-in, Busy, etc. The status of a user may reflect what project the user is working on. In some embodiments, such user status may be reflected only to those other users involved in the project, and may be 'do-not-disturb' to users not associated with the project.

Further details are now provided with respect to data item tagging. Inbound data items, such as those from external data sources, may be automatically tagged based on attributes such as keywords or sender/originator identity as examples. Additionally or alternatively, there may be a degree of manual validation/tagging, at least for initial data items of a workspace, or where no, or few, workspaces have been established. As data items are created in shared workspaces, automated tagging may become easier and more reliable. This may ease or eliminate the burden of manual validation/tagging, since data items would be auto-tagged against the workspace in which they are created. Once multiple users are working within the workspaces sharing a common workspace ID, exchanged data items would be tagged for that workspace. If a user creates an email from within a workspace called "End of Year Party", the email will be tagged with the ID of that workspace, and replies to that email may be automatically tagged with that workspace ID to indicate inclusion within that workspace. For data items (e.g. email) belonging to a newly created workspace or workspace not already setup for a given user associated with the project, a workspace of the same name and ID could be automatically created when the user receives the data item (e.g. email). The workspace may optionally remain dormant until the user starts actively working with that workspace. This dormancy can be useful in situations where a user received a data item but is not deeply involved with any of the tasks of the project, as an example. For instance, if a first user is working on a project that a second user in a different part of an organization is not a part of but the first user accidentally copies the second user on an email, the second user may not necessarily want that newly created workspace to pop up based on task due dates that are not of any concern to that second user. Thus, the workspace may exist and the second user may be able to find it if desired, but the workspace may not necessarily automatically be factored into the prioritization of the active workspaces that the second user is working on unless the second user actively begins working with that workspace.

As a further example of auto-tagging, suppose a customer sends an email regarding the return of a faulty product. The recipient user may use that email to create a new workspace labeled "RMA#1234—Pop-up Toaster" and move a copy of the customer's profile into that workspace. Any data items created within that workspace or other data items tagged with the workspace ID can be included within that workspace. Additionally, rules for alerts about that workspace and/or prioritization of the workspace can be setup automatically or manually. One rule might specify that any emails, chats, phone calls, etc. from that customer may activate that workspace (for instance bringing it to focus for the user). This may be the case until the user cancels that rule or sets a new one.

As noted, data items created within a workspace (locally created data items) may be automatically tagged with a workspace ID. FIG. 5 depicts an example process for tagging a locally created data item, in accordance with aspects described herein. In some examples, the process is performed by a data processing system, such as a client system, a central server, or a combination of both. In the example of FIG. 5, the user is working within the user interface and specifically within a particular workspace that has a workspace ID associated with it. The data item in this example is a document. When the user creates the document through that workspace, by, for instance, clicking an icon and composing/saving a new document through the interface that pops up, the current workspace ID is read (502), and the document is tagged with that workspace ID (504). The tagged document is then provided to the remote system (in this case), such as the central server for indexing (506).

By way of further example, when the user creates an email through a workspace, the email will be tagged, automatically in some examples, or manually in others, with the workspace ID, which may be a unique number. Replies to that email received by the system may maintain that workspace ID so that the replies are automatically tagged with that workspace ID and are grouped into that workspace. In the example of email, the workspace ID may be edited into the metadata in the email header, which would not normally be displayed when the user reads the email but is metadata of that data item.

In the above example of an email message, the workspace ID tag is carried through in the metadata of the message. In other examples of data items, where the tag is not carried as part of the data itself, the system can examine attributes of the data item (filename, fingerprint, etc) and associate the appropriate tag with the data item. In this regard, replies, revisions, etc. to a data item may be examined and tagged appropriately. Workspaces may then be prioritized based on this tagging. Further details are now provided with reference to FIG. 6.

FIG. 6 depicts one example of data item tagging and priority adjustment based thereon, in accordance with aspects described herein. In some examples, the process is performed by a data processing system, such as a client system, a central server, or a combination of both. The process may be performed based on receiving or obtaining a data item. In the example of FIG. 6, the obtained data item is a document.

The process begins by checking the document metadata for a workspace identifier (602). It is determined whether the document has a workspace ID (604) and, if not, the document content and metadata is analyzed. For instance, the document content and metadata is scanned for attributes such as keywords (606). Based on that analysis, it is determined which workspace ID (existing or a new one) is most likely to be applied to that data item, and the document is tagged with that workspace ID (608). In this example, the tag is applied via metadata, for instance by including a <workspace ID> tag therein.

If it was determined at 604 that the document does have a workspace ID, then it is determined whether that workspace ID matches a local workspace ID (610). In this regard, the document hay have a workspace ID that was applied through another user's account, or client device, but a workspace for that workspace ID has not yet been created on the receiving user's account or client device. Assuming there is no matching local workspace ID, a new local workspace is created based on that workspace ID (612).

Once the new local workspace is created for the document (612), or if the workspace ID of the document matches a local workspace ID (610-YES), or based on determining the most likely workspace ID and tagging the item with that workspace ID (608), the document metadata is scanned and the document is assigned a priority indicator (614). Then, the priority of the workspace having that workspace ID is adjusted, the document is displayed (e.g. in the workspace in the user interface) and the user is informed (616).

Thus, the priority of the workspace, in some cases relative to other local workspaces that are present, may be adjusted based on receipt of this document. As one example, the received document may be one that is for the receiving user to review and/or approve. There is a task, then, associated with the workspace, and more particularly pertaining to the document. The task is to review/approve the document. In this regard, the task may have a priority. The priority for the task may be set manually, automatically, or by a combination of the two. For instance, the document may have been provided with a note from the sender requesting that the document be reviewed/approved within 24 hours. The system can be configured to automatically detect the request that the document be addressed within 24 hours, and create a task 'Review/approve document within 24 hours' with a relatively high priority. Alternatively, the user may manually mark that the document is to be addressed within 24 hours. In any case, the priority of the task can, in turn, affect the priority of the workspace as a whole, the priority for which is reflected in relation to other workspaces for projects that the user is working on.

Below are some examples of how an incoming data item could be analyzed to trigger changes in priority of workspaces. They are provided as examples only, and many other examples are possible.

Email: Trigger—a new email from an executive received with a workspace ID tag matching that of a local workspace; Action—increase priority of the local workspace having that matching tag, proportionate to the executive's seniority in the organization, and add the email to the workspace Calendaring: Trigger—tagged meeting or conference call is about to start; Action —change user focus to the workspace having the workspace ID matching that of the meeting or conference call data item, and open relevant data item(s) from that workspace (meeting agenda, etc.)

Calendaring: Trigger—task deadline or milestone is approaching; Action—increase priority of the workspace in which the task is included, proportionate to proximity of the deadline/milestone date Telephony: Trigger—incoming call from a telephone number (data item) tagged with a workspace ID;

Action—when the call is answered, change user focus to the workspace having the workspace ID matching that of the incoming telephone number data item Instant messaging: Trigger—incoming chat from team member for which a corresponding data item (profile, contact card, etc.) is tagged with a workspace ID; Action—increase priority of the workspace having that workspace ID, and begin saving/archiving that chat to the workspace Social networking: Trigger—increased chatter (posts, updates, direct messages, etc.) between project team members for which corresponding data items (profiles, contact cards, etc.) are tagged with a common workspace ID; Action—increase priority of that workspace and add that chatter to the workspace In some embodiments, an application suite may be created that has the capability to manage data items such as documents, emails, chats, social networking updates/posts, calendared events, incoming telephony communications, and so forth, and incorporate the systems/functionality described with reference to FIG. 2 above. Provided thereby is a task-centric workspace environment that could be presented in a user interface of a client device, and optionally be executed partially or wholly on the client device. Assuming the individual data items could incorporate the workspace ID tags in, e.g., their metadata, the back-end system(s) main server would not necessarily need to be aware of the changes on the client side, provided that this metadata was not removed or altered in transit. The client application could be written to support these new features, while legacy back-end systems may work, per usual, without changes. For example in the example above "Telephony Trigger", a record of a telephone number and caller-ID would be enough. It would not be necessary to change how the telephone system works, in that example. In other examples, email allows additional headers to be included with messages, and many types of documents allow new metadata to be defined under their existing specification.

Example technologies offered by International Business Machines Corporation, Armonk, N.Y., USA, and that may support aspects described herein include:

IBM Notes and Domino® provides functions such as integrated email, calendaring, instant messaging and document editing which could be integrated with a system described herein (DOMINO is a registered trademark of International Business Machines Corporation, Armonk, N.Y.);

IBM SmartCloud Docs™ provides online editing and collaboration (IBM SMARTCLOUD DOCS is a trademark of International Business Machines Corporation, Armonk, N.Y.); and IBM Social Network and Discovery (SaND) social technology analyzes social media data and identifies links between people and documents.

Aspects described herein bring together different data sources, collate them on a project/workload basis, and present them in an interactive graphical way that automatically brings the user's focus to projects/tasks by importance. The functionality therefore extends beyond pulling data from sources and presenting it in, for instance, a flat list sorted on an arbitrary attribute such as arrival time, posting time, or other user-selected attribute.

Aspects described herein additionally provide the following points of functionality, among others:

Groups and filters data items in such a way to allow the user to focus on the most important tasks at any given time;

Automatically tags data items, created within or associated with a workspace, with a unique workspace ID, and automatically analyzes attributes of incoming data items and tags untagged items based on data item content, metadata and/or keywords;

Dynamically alters priority of a workspace, and in turn the graphical depiction of the workspace, based on a user generated events, timed events and incoming data item priorities;

Displays the most important tasks/projects in real-time in such a way that it is obvious to the user which tasks/projects the user should be focusing on;

Provides a task-centric workspace where data items are grouped, stored, and can be manipulated, while providing analysis of incoming data item attributes to alter priority and impact on associated workspace(s) and task(s), and visual representation of this priority, such as position on the screen, or size, color or animation of workspaces, to the user to allow the user to focus on the tasks that will maximize productivity; and Incorporates document creation/consumption within a workspace.

FIGS. 7-12 depict example processes for aspects described herein. The processes may be performed, in whole or in part, by one or more data processing systems, such as those described above.

Figure 7:
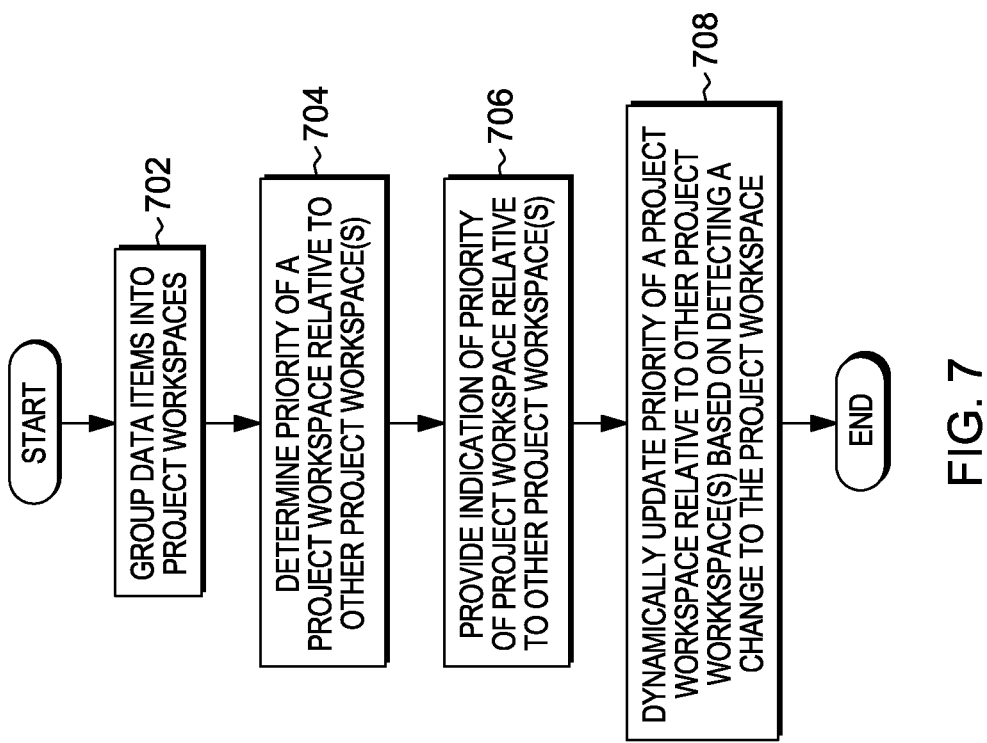
FIG. 7 depicts an example process to prioritize project workspaces, in accordance with aspects described herein.

FIG. 7 depicts an example process to prioritize project workspaces, in accordance with aspects described herein. The process begins by grouping data items into a plurality of project workspaces (702). This grouping may be based on workspace identifiers with which the data items have been tagged, in which grouped data items included in a project workspace are tagged with a common workspace identifier. The common workspace identifier can indicate association of those grouped data items with a project to which that project workspace corresponds. Each project includes task(s) for a user, as described above. An example of grouping data items is provided below with reference to FIG. 9.

The method continues by determining priority of a project workspace relative to priority of other project workspace(s) (704). The priority of the project workspace may be determined based on ascertaining priorities of the task(s) of the project. In some examples, priorities of the tasks are ascertained by analyzing the grouped data items included in the project workspace. Next, an indication is provided of the priority of the project workspace relative to priority of the other project workspace(s) (706). This may be provided for graphical presentation to the user, in order to facilitate focusing the user to a highest priority project workspace of the project workspaces.

The method continues by dynamically updating priority of the project workspace relative to priority of the other project workspace(s), based on detecting a change to the project workspace (708). Detecting that the change has been made to the project workspace may include detecting an addition of a data item to the project workspace. Additionally or alternatively, detecting that the change has been made to the project workspace may include determining that a change has been made to a priority of a task of the one or more tasks. An example of detecting a change to a project workspace is provided below with reference to FIG. 8.

In some embodiments, providing the indication of the priority of the project workspace includes presenting an interactive user interface to the user. The user interface can provide a visual indication of priority of the project workspace(s) relative to each other, for instance based on importance/priority of completing tasks of those project workspaces. Each project workspace may be represented in the user interface by a respective graphical container, and the provided visual indication of priority for the project workspace may include sizing the graphical container and/or migrating the graphical container toward a focal point of the user interface, according to the priority of that project workspace. Additionally or alternatively, the visual indication of priority for a highest priority project workspace may be provided by bringing the graphical container of the highest priority project workspace to a front of the user interface.

Figure 8:
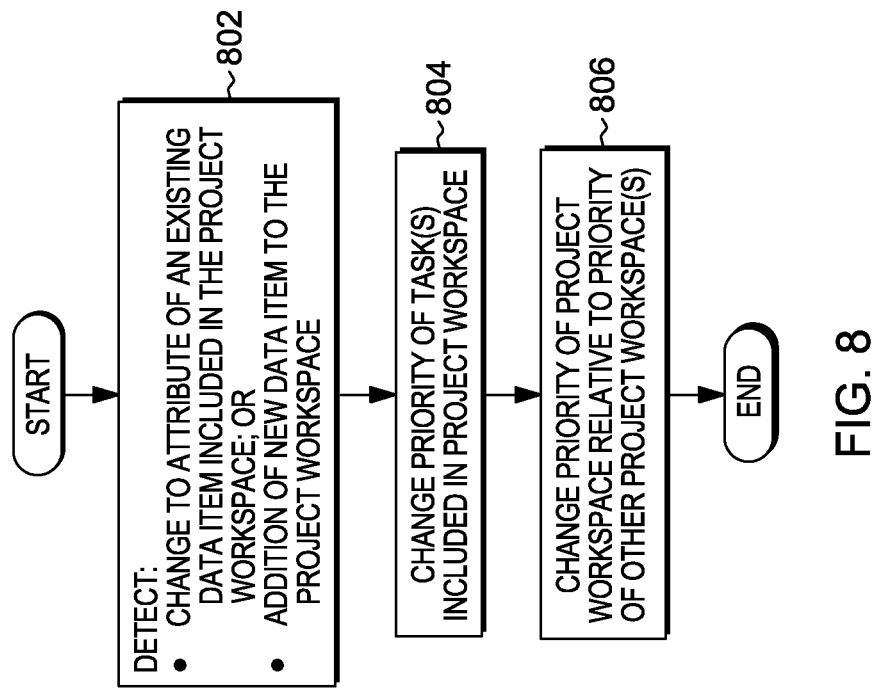
FIG. 8 depicts an example process for detecting a change to a project workspace, in accordance with aspects described herein.

FIG. 8 depicts an example process for detecting a change to a project workspace, in accordance with aspects described herein. The process begins by detecting a change to an attribute of an existing data item included in the project workspace and/or the addition of a new data item to the project workspace (802). In response to this detecting, the process changes priority of one or more tasks included in the project workspace (804). Based on this changing the priority of the one or more tasks, priority of the project workspace is changed relative to priority of the other project workspace(s) (806), and the process ends.

Figure 9:
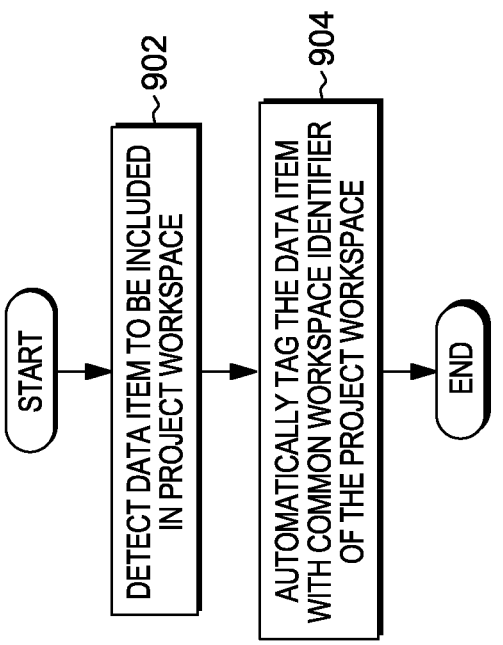
FIG. 9 depicts an example process for grouping data items by tagging, in accordance with aspects described herein.

FIG. 9 depicts an example process for grouping data items through tagging (see FIG. 7, #702), in accordance with aspects described herein. The grouping involves tagging these data items with a common workspace identifier. First the process detects a data item to be included in a project workspace (902). The data item could be added by a user working within a project workspace by creating the data item within the project workspace, or a system could automatically determine that the data item should be included in the project workspace, as examples. In any case, the data item is automatically tagged with the common workspace identifier corresponding to the project workspace (904), to include the data item within the project workspace, and the process ends.

Figure 10:
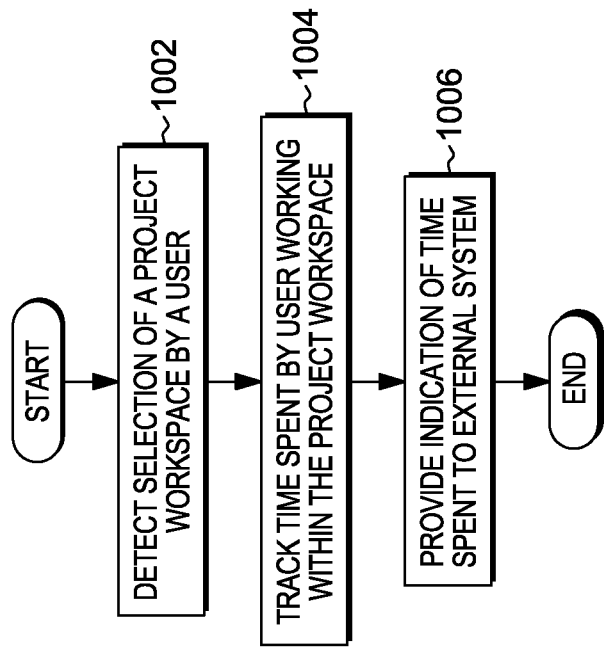
FIG. 10 depicts an example process for tracking time spent by a user working on a project, in accordance with aspects described herein.

FIG. 10 depicts an example process for tracking time spent by a user working on a project, in accordance with aspects described herein. In some examples, this is done through tracking time spent by a user working within the project workspace for that project. The method begins by detecting selection of a project workspace by a user (1002). Then, the time spent by that user working within that project workspace is tracked (1004), which may involve detecting when the user is and is not working with the workspace. It may involve detecting when the user exits or closes the workspace, or more generally detecting that the user is not interacting with the workspace for a period of time. An indication of an amount of time spent by the user working within the project workspace is then provided to an external system (1006), such as a time keeping system.

Users may be provided the ability to temporarily de-prioritize a project workspace, for instance temporarily hide the workspace or mute alerts thereof. FIG. 11 depicts one example of a process to temporarily de-prioritize a project workspace, in accordance with aspects described herein. The process begins by detecting a gesture to de-prioritize the project workspace (1102). In one example, the user swipes the graphical depiction of the workspace off of the screen or away from a focal point thereof. Based on this, the workspace is de-prioritized, and the graphical representation of the project workspace is manipulated (1104). In some examples, the graphical container of the project workspace is moved away from a focal point of the user interface. In other examples, the workspace is removed entirely from the screen. At some later time, perhaps on a recurring basis, the priority of the task(s) of the project workspace are ascertained and the project workspace may be automatically re-prioritized (1106). This may include bringing the project workspace back to its previous priority, or starting it with a lower priority and raising the priority as further time passes. In a specific example, the graphical depiction of the workspace is automatically moved back toward the focal point over a duration of time, which may be set based on ascertaining the priority/priorities of the task(s) of the project. By way of specific example, if a task for a workspace is due in five days and the user swipes away the workspace, the next day the workspace may return and drift back toward the focal point over the course of the next four days. If only a relatively short amount of time (such as a day or a few hours) exists between re-prioritization of a temporarily-de-prioritized workspace and the due date for the task a more disruptive indication of priority may be provided. For example, the workspace can be caused to move rapidly back toward the focal point, it may be placed at/on the focal point, and/or it may be highlighted or animated to indicate its urgency.

FIG. 12 depicts an example process of focusing a project workspace based on an incoming communication, in accordance with aspects described herein. The process begins by detecting an incoming communication from a participant in a target project workspace (1202). The communication could be a phone call, for instance, incoming to a user's client device that presents a user interface in accordance with aspects described herein. Based on detecting the incoming communication, that particular target project workspace can be brought-to-focus (1204), in which case the workspace the user is currently working in is minimized and the target project workspace is presented to the user. This may be especially desired when the user interface is provided to the user on a mobile device that receives phone calls. The target project workspace may be brought to a front of the user interface based on receiving an incoming call from another user that is associated with a grouped data item of the target project workspace.

FIG. 13 depicts one example of a data processing system to incorporate and use one or more aspects of the present invention. Data processing system 1300 may be based on, for instance, the xSeries® or pSeries® architectures offered by International Business Machines Corporation, Armonk, N.Y. (xSeries® and pSeries® are registered trademarks of International Business Machines Corporation, Armonk, N.Y.), or on Intel Corporation's x86 architecture.

Data processing system 1300 is suitable for storing and/or executing program code and includes at least one processor 1302 coupled directly or indirectly to memory 1304 through, e.g., a system bus 1320. In operation, processor(s) 1302 obtain from memory 1304 one or more instructions for execution by the processors. Memory 1304 may include local memory employed during actual execution of the program code, bulk storage, and cache memories which provide temporary storage of at least some program code in order to reduce the number of times code must be retrieved from bulk storage during program code execution. A non-limiting list of examples of memory 1304 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 1304 includes an operating system 1305 and one or more computer programs 1306, for instance computer programs that execute to perform aspects described herein.

Input/Output (I/O) devices 1312, 1314 (including but not limited to keyboards, displays, pointing devices, etc.) may be coupled to the system either directly or through I/O controllers 1310.

Network adapters 1308 may also be coupled to the system to enable the data processing system to become coupled to other data processing systems or remote printers or storage devices through intervening private or public networks. Modems, cable modems, and Ethernet cards are just a few of the currently available types of network adapters 1308.

Data processing system 1300 may be coupled to storage 1316 (e.g., a non-volatile storage area, such as magnetic disk drives, optical disk drives, a tape drive, etc.), having one or more databases. Storage 1316 may include an internal storage device or an attached or network accessible storage. Computer programs in storage 1316 may be loaded into memory 1304 and executed by a processor 1302 in a manner known in the art.

The data processing system 1300 may include fewer components than illustrated, additional components not illustrated herein, or some combination of the components illustrated and additional components. Data processing system 1300 may include any computing device known in the art, such as a mainframe, server, personal computer, workstation, laptop, handheld computer, telephony device, network appliance, virtualization device, storage controller, etc.

The present invention may be a system, a method, and/or a computer program product. The computer program product may include a computer readable storage medium (or media) having computer readable program instructions thereon for causing a processor to carry out aspects of the present invention.

Figure 14:
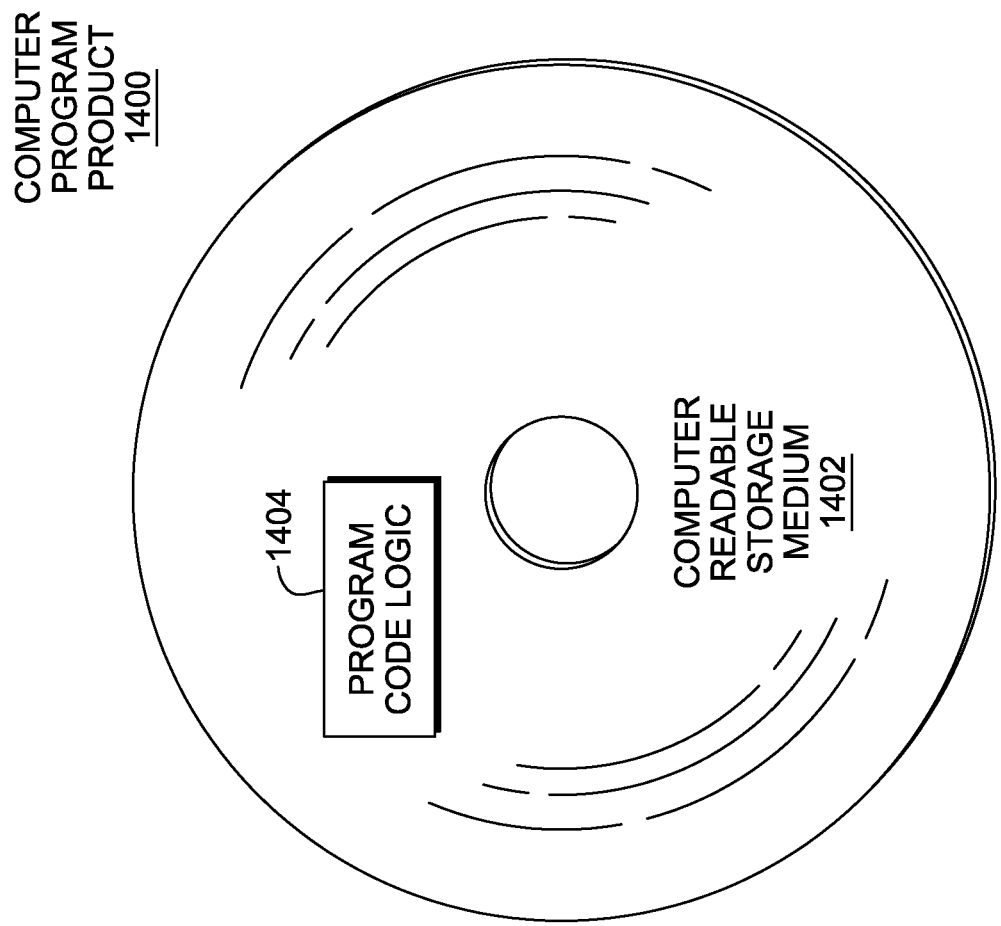
FIG. 14 depicts one embodiment of a computer program product incorporating one or more aspects described herein.

Referring to FIG. 14, in one example, a computer program product 1400 includes, for instance, one or more non-transitory computer readable storage media 1402 to store computer readable program code means, logic and/or instructions 1404 thereon to provide and facilitate one or more embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is understood that although the following provides a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 15:
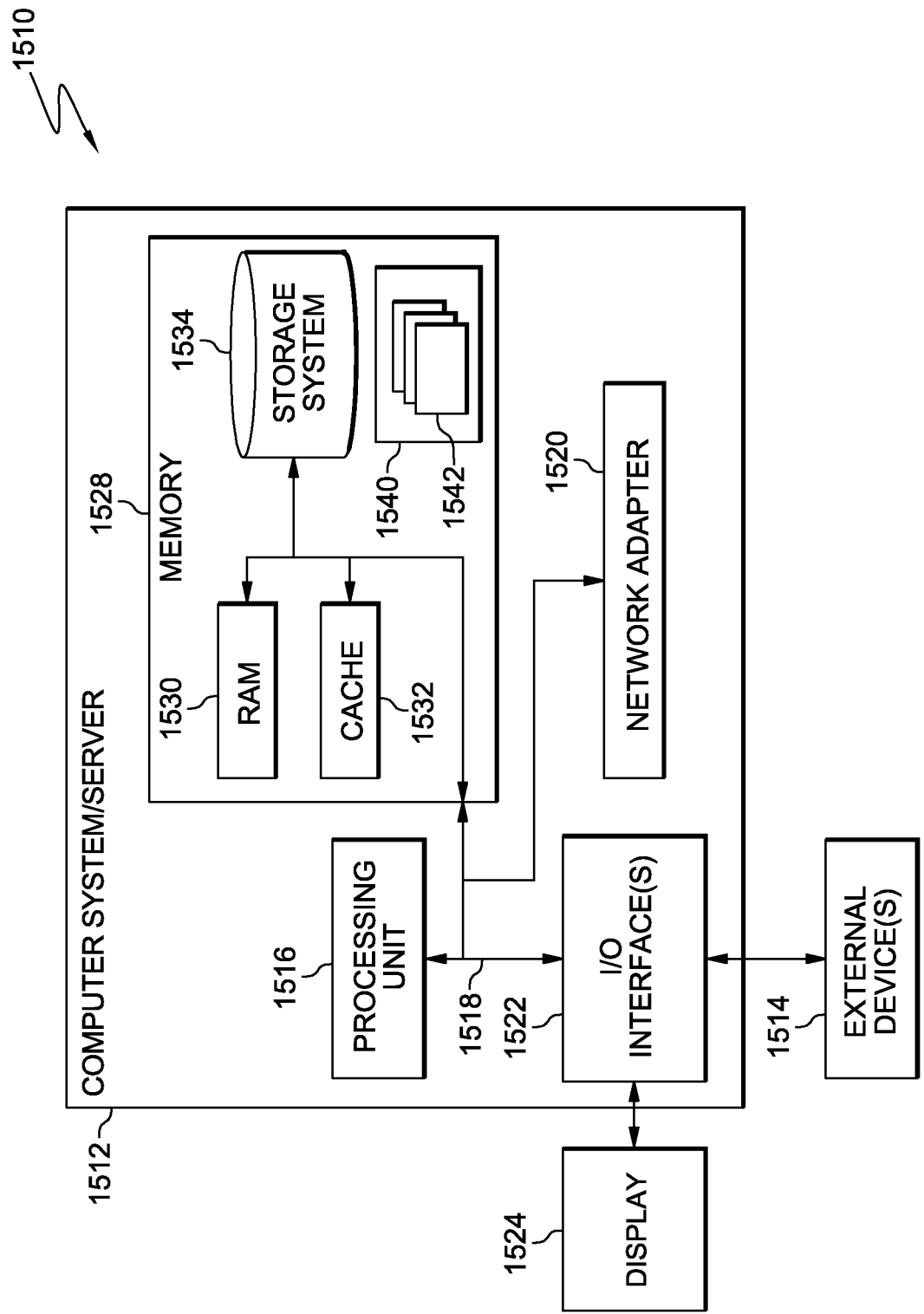
FIG. 15 depicts a cloud computing node according to embodiments described herein.

Referring now to FIG. 15, a schematic of an example of a cloud computing node is shown. Cloud computing node 1510 is only one example of a suitable cloud computing node and is not intended to suggest any limitation as to the scope of use or functionality of embodiments of the invention described herein. Regardless, cloud computing node 1510 is capable of being implemented and/or performing any of the functionality set forth hereinabove.

In cloud computing node 1510 there is a computer system/server 1512, which is operational with numerous other general purpose or special purpose computing system environments or configurations. Examples of well-known computing systems, environments, and/or configurations that may be suitable for use with computer system/server 1512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 1512 in cloud computing node 1510 is shown in the form of a general-purpose computing device. The components of computer system/server 1512 may include, but are not limited to, one or more processors or processing units 1516, a system memory 1528, and a bus 1518 that couples various system components including system memory 1528 to processor 1516.

Bus 1518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1512 typically includes a variety of computer system readable media. Such media may be any available media that is accessible by computer system/server 1512, and it includes both volatile and non-volatile media, removable and non-removable media.

System memory 1528 can include computer system readable media in the form of volatile memory, such as random access memory (RAM) 1530 and/or cache memory 1532. Computer system/server 1512 may further include other removable/non-removable, volatile/non-volatile computer system storage media. By way of example only, storage system 1534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1518 by one or more data media interfaces. As will be further depicted and described below, memory 1528 may include at least one program product having a set (e.g., at least one) of program modules that are configured to carry out the functions of embodiments of the invention.

Program/utility 1540, having a set (at least one) of program modules 1542, may be stored in memory 1528 by way of example, and not limitation, as well as an operating system, one or more application programs, other program modules, and program data. Each of the operating system, one or more application programs, other program modules, and program data or some combination thereof, may include an implementation of a networking environment. Program modules 1542 generally carry out the functions and/or methodologies of embodiments of the invention as described herein.

Computer system/server 1512 may also communicate with one or more external devices 1514 such as a keyboard, a pointing device, a display 1524, etc.; one or more devices that enable a user to interact with computer system/server 1512; and/or any devices (e.g., network card, modem, etc.) that enable computer system/server 1512 to communicate with one or more other computing devices. Such communication can occur via Input/Output (I/O) interfaces 1522.

Still yet, computer system/server 1512 can communicate with one or more networks such as a local area network (LAN), a general wide area network (WAN), and/or a public network (e.g., the Internet) via network adapter 1520. As depicted, network adapter 1520 communicates with the other components of computer system/server 1512 via bus 1518. It should be understood that although not shown, other hardware and/or software components could be used in conjunction with computer system/server 1512. Examples, include, but are not limited to: microcode, device drivers, redundant processing units, external disk drive arrays, RAID systems, tape drives, and data archival storage systems, etc.

Figure 16:
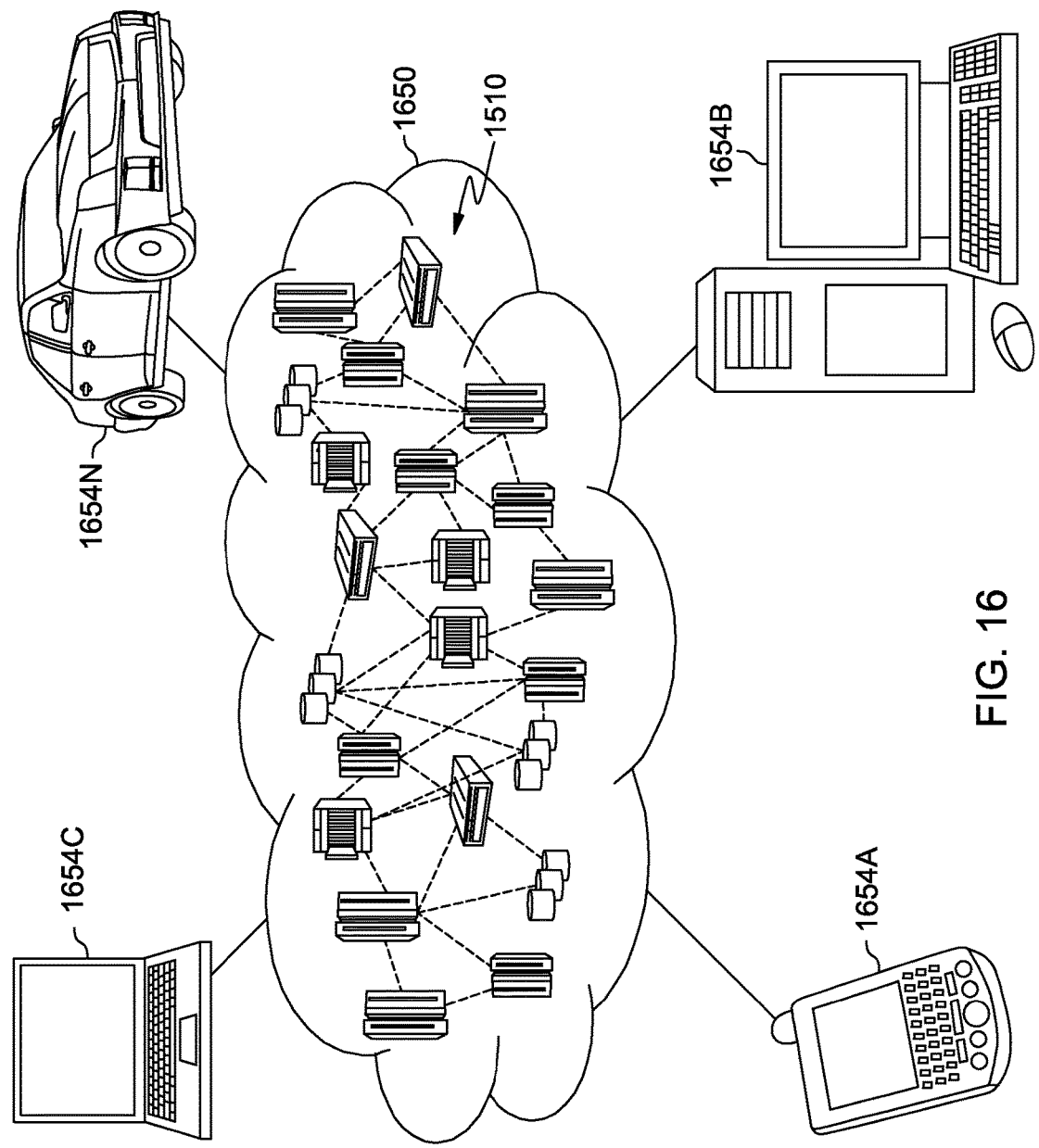
FIG. 16 depicts a cloud computing environment according to embodiments described herein.

Referring now to FIG. 16, illustrative cloud computing environment 1650 is depicted. As shown, cloud computing environment 1650 comprises one or more cloud computing nodes 1510 with which local computing devices used by cloud consumers, such as, for example, personal digital assistant (PDA) or cellular telephone 1654A, desktop computer 1654B, laptop computer 1654C, and/or automobile computer system 1654N may communicate. Nodes 1510 may communicate with one another. They may be grouped (not shown) physically or virtually, in one or more networks, such as Private, Community, Public, or Hybrid clouds as described hereinabove, or a combination thereof. This allows cloud computing environment 1650 to offer infrastructure, platforms and/or software as services for which a cloud consumer does not need to maintain resources on a local computing device. It is understood that the types of computing devices 1654A-N shown in FIG. 16 are intended to be illustrative only and that computing nodes 1510 and cloud computing environment 1650 can communicate with any type of computerized device over any type of network and/or network addressable connection (e.g., using a web browser).

Figure 17:
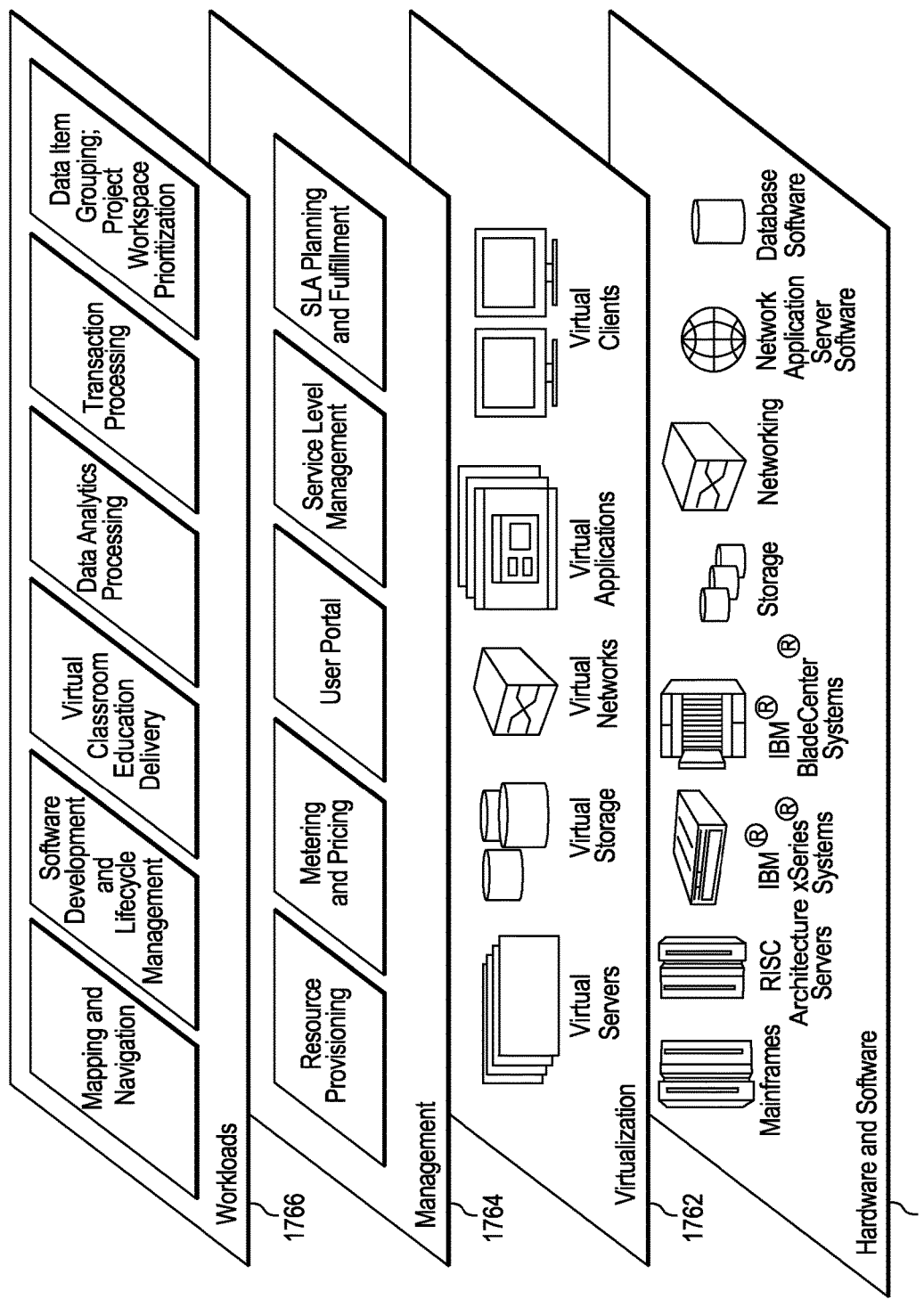
FIG. 17 depicts abstraction model layers according to embodiments described herein.

Referring now to FIG. 17, a set of functional abstraction layers provided by cloud computing environment 1650 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 1760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1762 provides an abstraction layer from which the following examples of virtual entities may be provided: virtual servers; virtual storage; virtual networks, including virtual private networks; virtual applications and operating systems; and virtual clients.

In one example, management layer 1764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data item grouping and project workspace prioritization.

Further details are now provided regarding service delivery, in accordance with aspects described herein and with regard to the following aspects: Integration, On-demand, and Virtual Private Networks.

Integration:

Integration service delivery incorporates the following aspects:
  Identify any software on the clients and servers including the network operating system where the process software will be deployed that are required by the process software or that work in conjunction with the process software;
  Identify the network operating system that is software that enhances a basic operating system by adding networking features;
  Identify the software applications and version numbers and compare them to the list of software applications and version numbers that have been tested to work with the process software. Those software applications that are missing or that do not match the correct version will be upgraded with the correct version numbers;
  Check the program instructions that pass parameters from the process software to the software applications to ensure the parameter lists match the parameter lists required by the process software. Check parameters passed by the software applications to the process software to ensure the parameters match the parameters required by the process software;
  Identify the client and server operating systems including the network operating systems and compare to the list of operating systems, version numbers and network software that have been tested to work with the process software. Upgrade on the clients and servers those operating systems, version numbers and network software that do not match the list of tested operating systems and version numbers.

More details about integration are now provided. The process software, which can perform one or more aspects described herein is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Referring to FIGS. 18 & 19, which collectively depict an example process for integration service delivery in accordance with aspects described herein, the process begins by determining whether there are any process software programs that will execute on a server or servers 1821. If this is not the case, then integration proceeds to 1827. If this is the case, then the server addresses are identified 1822. The servers are checked to see if they contain software that includes the operating system (OS), applications, and network operating systems (NOS), together with their version numbers that have been tested with the process software 1823. The servers are also checked to determine if there is any missing software that is required by the process software 1823.

A determination is made if the version numbers match the version numbers of OS, applications and NOS that have been tested with the process software 1824. If all of the versions match and there is no missing required software, the integration continues in 1827.

If one or more of the version numbers do not match, then the unmatched versions are updated on the server or servers with the correct versions 1825. Additionally if there is missing required software, then it is updated on the server or servers 1825. The server integration is completed by installing the process software 1826.

Step 1827 which follows either 1821, 1824 or 1826 determines if there are any programs of the process software that will execute on the clients. If no process software programs execute on the clients the integration ends. If this not the case, then the client addresses are identified 1828.

The clients are checked to see if they contain software that includes the operating system (OS), applications, and network operating systems (NOS), together with their version numbers that have been tested with the process software 1829. The clients are also checked to determine if there is any missing software that is required by the process software 1829.

A determination is made is the version numbers match the version numbers of OS, applications and NOS that have been tested with the process software 1931. If all of the versions match and there is no missing required software, then the integration ends.

If one or more of the version numbers do not match, then the unmatched versions are updated on the clients with the correct versions 1932. In addition, if there is missing required software then it is updated on the clients 1932. The client integration is completed by installing the process software on the clients 1933. The integration then ends.

On-Demand:

On-demand service delivery incorporates the following aspects:

- The process software can be stored on a shared file system accessible from one or more servers.
- The process software is executed via transactions that contain data and server processing requests that use CPU units on the accessed server. CPU units are units of time such as minutes, seconds, hours on the central processor of the server.
- Additionally the accessed server may make requests of other servers that require CPU units. CPU units are an example that represents but one measurement of use. Other measurements of use include but are not limited to network bandwidth, memory usage, storage usage, packet transfers, complete transactions, etc.
- When multiple customers use the same process software application, their transactions are differentiated by the parameters included in the transactions that identify the unique customer and the type of serve for that customer.
- All of the CPU units and other measurements of use that are used for the services for each customer are recorded.
- When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage, etc. are added to share the workload.
- The measurements of use used for each service and customer are sent to a collecting server that sums the measurements of use for each customer for each service that was processed anywhere in the network of servers that provide the shared execution of the process software.
- The summed measurements of use units are periodically multiplied by unit costs and the resulting total process software application service costs are alternatively sent to the customer and/or indicated on a web site accessed by the customer which then remits payment to the service provider.
- In another embodiment, the service provider requests payment directly from a customer account at a banking or financial institution.
- In another embodiment, if the service provider is also a customer of the customer that uses the process software application, the payment owed to the service provider is reconciled to the payment owed by the service provider to minimize the transfer of payments.

More details about on-demand are now provided. The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer, which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 20:
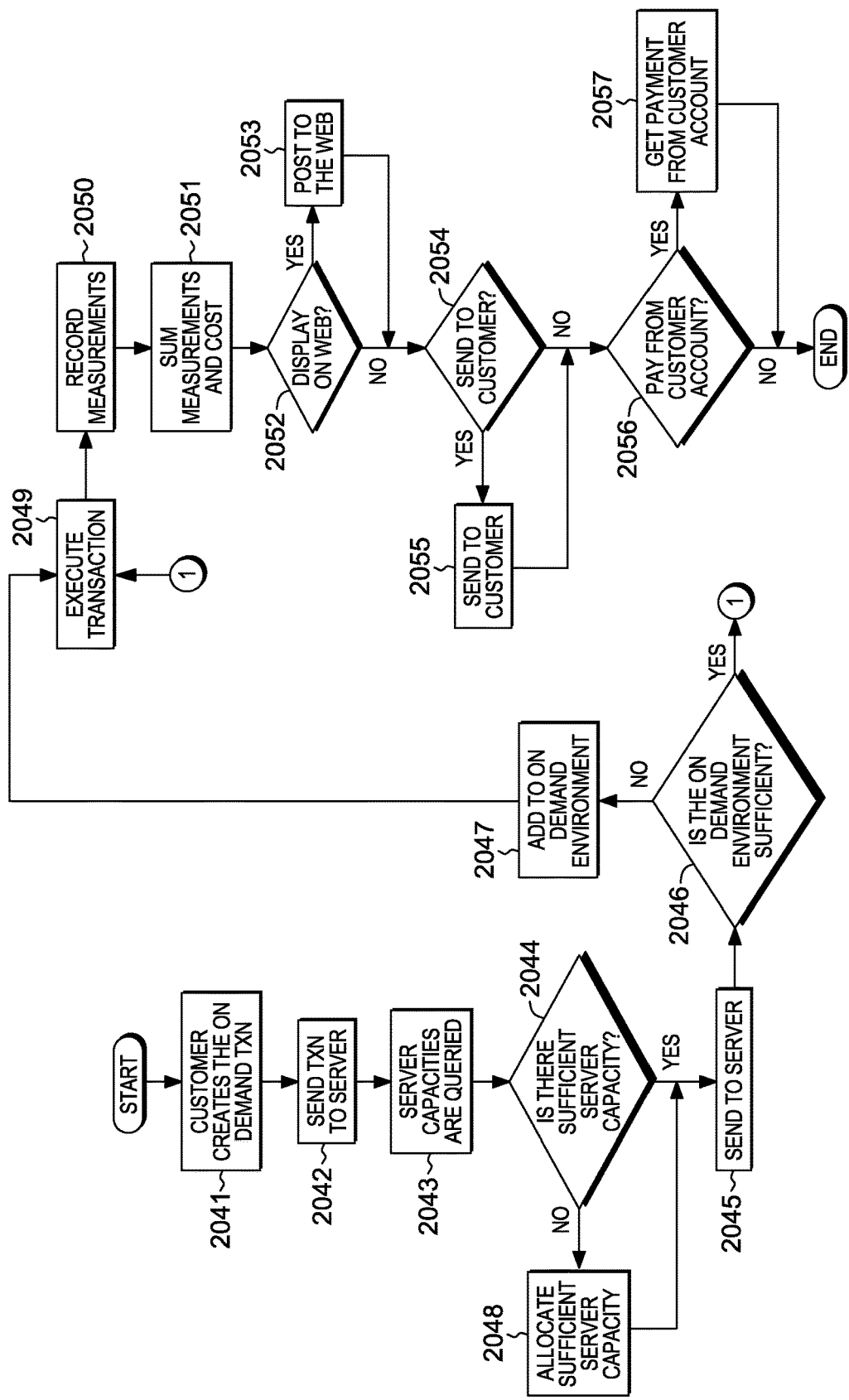
FIG. 20 depicts an example process for on-demand service delivery, in accordance with aspects described herein.

Referring to FIG. 20, which depicts an example process for on-demand service delivery in accordance with aspects described herein, the process begins by a transaction being created than contains the unique customer identification, the requested service type and any service parameters that further specify the type of service 2041. The transaction is then sent to the main server 2042. In an On Demand environment the main server can initially be the only server, and then as capacity is consumed other servers are added to the On Demand environment.

The server central processing unit (CPU) capacities in the On Demand environment are queried 2043. The CPU requirement of the transaction is estimated, then the server's available CPU capacity in the On Demand environment is compared to the transaction CPU requirement to see if there is sufficient CPU available capacity in any server to process the transaction 2044. If there is not sufficient server CPU available capacity, then additional server CPU capacity is allocated to process the transaction 2048. If there was already sufficient Available CPU capacity then the transaction is sent to a selected server 2045.

Before executing the transaction, a check is made of the remaining On Demand environment to determine if the environment has sufficient available capacity for processing the transaction. This environment capacity consists of such things as but not limited to network bandwidth, processor memory, storage etc. 2046. If there is not sufficient available capacity, then capacity will be added to the On Demand environment 2047. Next the required software to process the transaction is accessed, loaded into memory, and then the transaction is executed 2049.

The usage measurements are recorded 2050. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 2051.

If the customer has requested that the On Demand costs be posted to a web site 2052 then they are posted 2053. If the customer has requested that the On Demand costs be sent via e-mail to a customer address 2054 then they are sent 2055. If the customer has requested that the On Demand costs be paid directly from a customer account 2056 then payment is received directly from the customer account 2057, and the process ends.

Virtual Private Network:

The process software may be deployed, accessed, and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets up a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figures 21, 22:
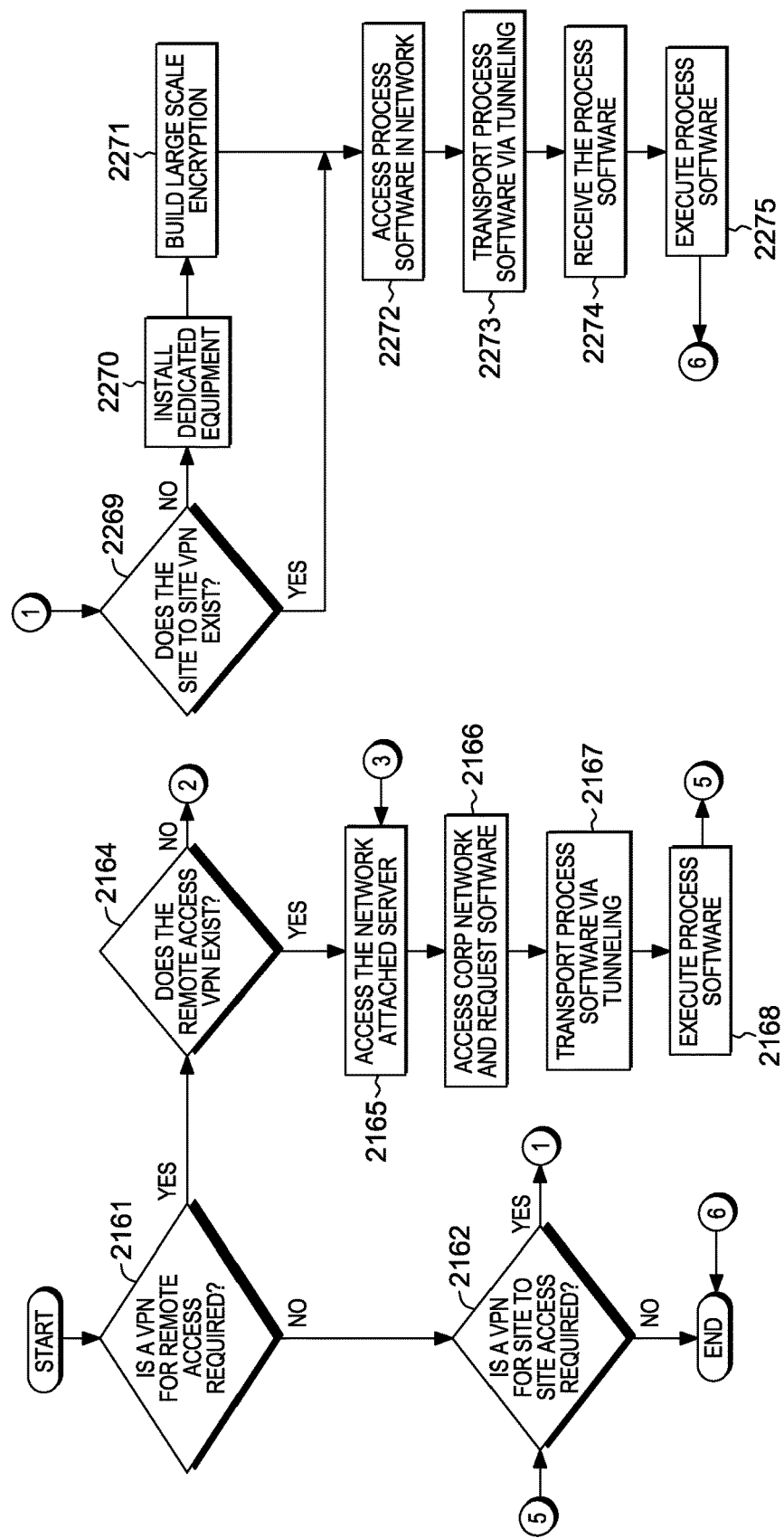
FIGS. 21-23 collectively depict an example process by which aspects described herein may be deployed, accessed, and executed through the use of a virtual private network, in accordance with aspects described herein.
Figure 23:
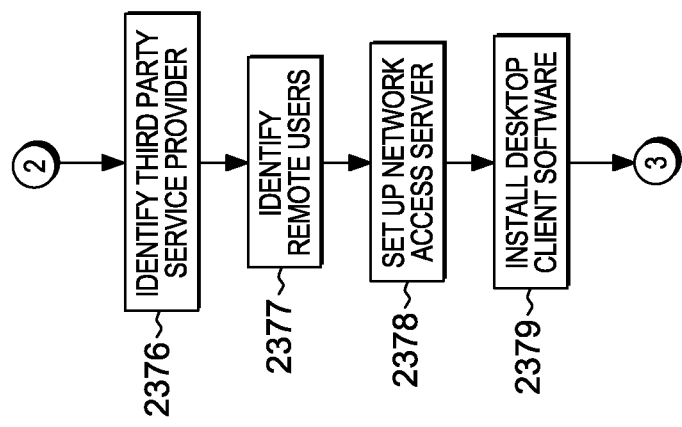

Referring now to FIGS. 21-23, which collectively depict an example process by which aspects described herein may be deployed, accessed, and executed through the use of a virtual private network, in accordance with aspects described herein, the process begins by determining whether a VPN for remote access is required 2161. If it is not required, then proceed to 2162. If it is required, then determine if the remote access VPN exists 2164.

If it does exist, then proceed to 2165. Otherwise identify the third party provider that will provide the secure, encrypted connections between the company's private network and the company's remote users 2376. The company's remote users are identified 2377. The third party provider then sets up a network access server (NAS) 2378 that allows the remote users to dial a toll free number or attach directly via a cable or DSL modem to access, download and install the desktop client software for the remote-access VPN 2379.

After the remote access VPN has been built or if it been previously installed, the remote users can then access the process software by dialing into the NAS or attaching directly via a cable or DSL modem into the NAS 2165. This allows entry into the corporate network where the process software is accessed 2166. The process software is transported to the remote user's desktop over the network via tunneling. That is, the process software is divided into packets and each packet including the data and protocol is placed within another packet 2167. When the process software arrives at the remote user's desktop, it is removed from the packets, reconstituted and then is executed on the remote user's desktop 2168.

A determination is made to see if a VPN for site to site access is required 2162. If it is not required, then the process ends. Otherwise, determine if the site to site VPN exists 2269. If it does exist, then proceed to 2272. Otherwise, install the dedicated equipment required to establish a site to site VPN 2270. Then build the large scale encryption into the VPN 2271.

After the site to site VPN has been built or if it had been previously established, the users access the process software via the VPN 2272. The process software is transported to the site users over the network via tunneling 2273. That is, the process software is divided into packets and each packet including the data and protocol is placed within another packet. When the process software arrives 2274 at the remote user's desktop, it is removed from the packets, reconstituted and is executed on the site user's desktop 2275, and the process ends.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of graphically presenting digital workspaces in a graphical interface of a computer system, the method comprising:
grouping digital data items into a plurality of digital workspaces of the computer system based on workspace identifiers with which the digital data items have been tagged, wherein grouped digital data items included in a digital workspace of the plurality of digital workspaces are tagged with a common workspace identifier, the common workspace identifier indicating association of the grouped digital data items with a project to which the digital workspace corresponds, wherein the project includes one or more tasks for a user to perform on the computer system, and wherein the digital data items comprise a plurality of electronic communications received from at least one other user;
determining priority of the digital workspace relative to priority of one or more other digital workspaces of the plurality of digital workspaces, wherein the priority of the digital workspace is determined based on ascertaining priorities of the one or more tasks of the project by analyzing the grouped digital data items included in the digital workspace, wherein the determining the priority is performed dynamically as the plurality of electronic communications are received, and the priority of the digital workspace is modified dynamically, as one or more of the plurality of electronic communications are received, based at least in part on one or more attributes of the one or more electronic communications, and wherein priority of the digital workspace is further based on whether the plurality of electronic communications exceeds a threshold number of electronic communications and on a relationship between the user and one or more senders of at least one electronic communication of the plurality of electronic communications; and
graphically presenting the digital workspaces in the graphical interface of the computer system, wherein the graphically presenting graphically presents to the user an indication of the priority of the digital workspace relative to priority of the one or more other digital workspaces to focus the user to a highest priority digital workspace of the plurality of digital workspaces, and wherein the graphically presenting the indication of priority comprises positioning the digital workspace based on a focal point of a work area of the user on the graphical interface.

2. The method of claim 1, further comprising automatically dynamically updating the priority of the digital workspace relative to priority of the one or more other digital workspaces, based on detecting that a change has been made to the digital workspace.

3. The method of claim 2, wherein detecting that the change has been made to the digital workspace comprises detecting an addition of a digital data item in the digital workspace.

4. The method of claim 2, wherein detecting that the change has been made to the digital workspace comprises determining that a change has been made to a priority of a task of the one or more tasks.

5. The method of claim 4, further comprising:
detecting a change to an attribute of an existing digital data item included in the digital workspace and, in response, changing the priority of the task, and
based on changing the priority of the task, changing priority of the digital workspace relative to priority of the one or more other digital workspaces of the plurality of digital workspaces.

6. The method of claim 1, further comprising tagging the grouped data items with the common workspace identifier, wherein the tagging comprises:
detecting that a digital data item has been created by a user working within the digital workspace; and
automatically tagging the created digital data item with the common workspace identifier corresponding to the digital workspace, to include the created digital data item within the digital workspace.

7. The method of claim 1, further comprising tracking time spent by a user working within the digital workspace on the computer system, and providing an indication to an external system of an amount of time spent by the user working within the digital workspace.

8. The method of claim 1, wherein providing the indication of the priority of the digital workspace comprises presenting an interactive user interface to the user, the user interface providing a visual indication of priority of the plurality of digital workspaces relative to each other based on importance of completing tasks of the plurality of digital workspaces, wherein each digital workspace of the plurality of digital workspaces is represented in the user interface by a respective graphical container.

9. The method of claim 8, wherein the visual indication of priority for the digital workspace comprises sizing the graphical container according to priority of the digital workspace.

10. The method of claim 8, wherein the visual indication of priority for the highest priority digital workspace comprises bringing the graphical container of the highest priority digital workspace to a front of the user interface.

11. The method of claim 8, further comprising temporarily de-prioritizing the digital workspace, the temporarily de-prioritizing comprising:

based on the user gesturing on the user interface to de-prioritize the digital workspace, moving the graphical container of the digital workspace away from the focal point; and automatically moving the graphical container of the digital workspace back toward the focal point over a duration of time set based on ascertaining priorities of the one or more tasks of the project.

12. A computer system comprising:
   a memory; and
   a processor in communication with the memory, wherein the system is configured to perform a method for graphically presenting digital workspaces in a graphical interface of the computer system, the method comprising:
      grouping digital data items into a plurality of digital workspaces of the computer system based on workspace identifiers with which the digital data items have been tagged, wherein grouped digital data items included in a digital workspace of the plurality of digital workspaces are tagged with a common workspace identifier, the common workspace identifier indicating association of the grouped digital data items with a project to which the digital workspace corresponds, wherein the project includes one or more tasks for a user to perform on the computer system, and wherein the digital data items comprise a plurality of electronic communications received from at least one other user;
      determining priority of the digital workspace relative to priority of one or more other digital workspaces of the plurality of digital workspaces, wherein the priority of the digital workspace is determined based on ascertaining priorities of the one or more tasks of the project by analyzing the grouped digital data items included in the digital workspace, wherein the determining the priority is performed dynamically as the plurality of electronic communications are received, and the priority of the digital workspace is modified dynamically, as the plurality of electronic communications are received, based at least in part on one or more attributes of the one or more electronic communications, and wherein priority of the digital workspace is further based on whether the plurality of electronic communications exceed a threshold number of electronic communications and on a relationship between the user and one or more senders of at least one electronic communication of the plurality of electronic communications; and
      graphically presenting the digital workspaces in the graphical interface of the computer system, wherein the graphically presenting graphically presents to the user an indication of the priority of the digital workspace relative to priority of the one or more other digital workspaces to focus the user to a highest priority digital workspace of the plurality of digital workspaces, and wherein the graphically presenting the indication of priority comprises positioning the digital workspace based on a focal point of a work area of the user on the graphical interface.

13. The computer system of claim 12, wherein the method further comprises automatically dynamically updating the priority of the digital workspace relative to priority of the one or more other digital workspaces, based on detecting that a change has been made to the digital workspace.

14. The computer system of claim 13, wherein detecting that the change has been made to the digital workspace comprises determining that a change has been made to a priority of a task of the one or more tasks.

15. The computer system of claim 12, wherein the method further comprises tagging the grouped data items with the common workspace identifier, wherein the tagging comprises:
   detecting that a digital data item has been created by a user working within the digital workspace; and
   automatically tagging the created digital data item with the common workspace identifier corresponding to the digital workspace, to include the created digital data item within the digital workspace.

16. The computer system of claim 12, wherein providing the indication of the priority of the digital workspace comprises presenting an interactive user interface to the user, the user interface providing a visual indication of priority of the plurality of digital workspaces relative to each other based on importance of completing tasks of the plurality of digital workspaces, wherein each digital workspace of the plurality of digital workspaces is represented in the user interface by a respective graphical container.

17. A computer program product comprising a non-transitory computer readable storage medium having program instructions embodied therewith, the program instructions executable by a processor to cause the processor to perform a method for graphically presenting digital workspaces in a graphical interface of a computer system, the method comprising:
   grouping digital data items into a plurality of digital workspaces of the computer system based on workspace identifiers with which the digital data items have been tagged, wherein grouped digital data items included in a digital workspace of the plurality of digital workspaces are tagged with a common workspace identifier, the common workspace identifier indicating association of the grouped digital data items with a project to which the digital workspace corresponds, wherein the project includes one or more tasks for a user to perform on the computer system, and wherein the digital data items comprise a plurality of electronic communications received from at least one other user;
   determining priority of the digital workspace relative to priority of one or more other digital workspaces of the plurality of digital workspaces, wherein the priority of the digital workspace is determined based on ascertaining priorities of the one or more tasks of the project by analyzing the grouped digital data items included in the digital workspace, wherein the determining the priority is performed dynamically as the plurality of electronic communications are received, and the priority of the digital workspace is modified dynamically, as one or more of the plurality of electronic communications are received, based at least in part on one or more attributes of the one or more electronic communications, and wherein priority of the digital workspace is further based on whether the plurality of electronic communications exceeds a threshold number of electronic communications and on a relationship between the user and one or more senders of at least one electronic communication of the plurality of electronic communications; and
   graphically presenting the digital workspaces in the graphical interface of the computer system, wherein the graphically presenting graphically presents to the user an indication of the priority of the digital workspace relative to priority of the one or more other digital workspaces, to focus the user to a highest priority digital workspace of the plurality of digital workspaces, and wherein the graphically presenting the indication of priority comprises positioning the digital workspace based on a local point of a work area of the user on the graphical interface.

18. The computer program product of claim 17, wherein the method further comprises automatically dynamically updating the priority of the digital workspace relative to priority of the one or more other digital workspaces, based on detecting that a change has been made to the digital workspace.

19. The computer program product of claim 17, wherein providing the indication of the priority of the digital workspace comprises presenting an interactive user interface to the user, the user interface providing a visual indication of priority of the plurality of digital workspaces relative to each other based on importance of completing tasks of the plurality of digital workspaces, wherein each digital workspace of the plurality of digital workspaces is represented in the user interface by a respective graphical container.

20. The method of claim 1, wherein the priority of the digital workspace is further based on an urgency, as conveyed by the plurality of electronic communications, of a task of the project.

* * * * *